(12) United States Patent
Yun et al.

(10) Patent No.: US 11,905,157 B2
(45) Date of Patent: Feb. 20, 2024

(54) LIQUID DISPENSING DEVICE AND METHOD FOR CONTROLLING THE SAME

(71) Applicant: LG ELECTRONICS INC., Seoul (KR)

(72) Inventors: Junsang Yun, Seoul (KR); Kyungsoo Oh, Seoul (KR); Heesang Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 35 days.

(21) Appl. No.: 17/537,745

(22) Filed: Nov. 30, 2021

(65) Prior Publication Data

US 2022/0185650 A1   Jun. 16, 2022

(30) Foreign Application Priority Data

Dec. 15, 2020 (KR) .......................... 10-2020-0175281

(51) Int. Cl.
*B67D 1/08* (2006.01)
*B67D 1/00* (2006.01)
(Continued)

(52) U.S. Cl.
CPC ............ *B67D 1/0888* (2013.01); *B05B 15/70* (2018.02); *B67D 1/0014* (2013.01); *G01F 23/296* (2013.01); *B67D 2210/0001* (2013.01)

(58) Field of Classification Search
CPC .. B67D 1/0888; B67D 1/1405; B67D 1/0081; B67D 1/124; B67D 1/0014;
(Continued)

(56) References Cited

U.S. PATENT DOCUMENTS 4,437,497 A * 3/1984 Enander ............. G01F 23/2962
141/70
4,559,979 A * 12/1985 Koblasz ............. G01F 23/2962
141/11

(Continued)

FOREIGN PATENT DOCUMENTS

DE   10 2010 060 348 A1 † 5/2012
DE   102019114435      12/2020
(Continued)

OTHER PUBLICATIONS

Korean Office Action dated Jun. 21, 2022 issued in Application No. 10-2020-0175281.
(Continued)

*Primary Examiner* — Timothy L Maust
(74) *Attorney, Agent, or Firm* — KED & ASSOCIATES, LLP

(57) ABSTRACT

Disclosed herein are a water purifying device and a method for controlling the same. The water purifying device is characterized in that a water discharge module capable of moving vertically is provided with a sensor. Specifically, in the water purifying device of one embodiment, the sensor may measure a height of a container, by transmitting and receiving a signal for measuring a distance at a first point of the water discharge module, and may detect both a height of the inlet of the container and a water level, by transmitting and receiving the signal and measuring a water level at a second point of the water discharge module.

18 Claims, 21 Drawing Sheets

(51) Int. Cl.
*G01F 23/296* (2022.01)
*B05B 15/70* (2018.01)

(58) Field of Classification Search
CPC .......... B67D 1/1236; B67D 2210/0001; B67D 2210/00065; B05B 15/70; G01F 23/296
See application file for complete search history.

(56) References Cited

U.S. PATENT DOCUMENTS

| | | | |
|---|---|---|---|
| 4,572,253 A | 2/1986 | Farmer et al. | |
| 4,733,381 A * | 3/1988 | Farmer | B67D 1/1238 |
| | | | 141/94 |
| 4,780,861 A * | 10/1988 | Stembridge | B67D 1/1238 |
| | | | 367/908 |
| 4,961,456 A | 10/1990 | Stembridge et al. | |
| 4,976,091 A * | 12/1990 | Salemka | G05D 9/12 |
| | | | 53/503 |
| 5,491,333 A † | 2/1996 | Skell | |
| 6,082,419 A * | 7/2000 | Skell | B67D 1/1236 |
| | | | 141/351 |
| 6,394,153 B2 * | 5/2002 | Skell | B67D 1/1238 |
| | | | 141/351 |
| 7,353,850 B2 * | 4/2008 | Greiwe | A47J 31/4482 |
| | | | 141/270 |
| 7,690,403 B2 * | 4/2010 | You | G01F 23/2962 |
| | | | 141/83 |
| 8,167,004 B2 * | 5/2012 | Lee | B67D 1/0888 |
| | | | 141/96 |
| 8,695,646 B2 * | 4/2014 | Agam | G01S 15/87 |
| | | | 141/94 |
| 9,173,520 B2 * | 11/2015 | Jungclaus | A47J 31/58 |
| 9,352,950 B2 * | 5/2016 | Berger | B67D 1/0895 |
| 9,739,517 B2 * | 8/2017 | Root | B67D 1/0888 |
| 9,918,584 B2 * | 3/2018 | Bergdahl | A47J 31/401 |
| 10,343,888 B2 * | 7/2019 | Jeon | B67D 1/1405 |
| 10,941,031 B2 * | 3/2021 | Jung | B67D 1/0014 |
| 10,941,048 B2 * | 3/2021 | Moon | B67D 1/0859 |
| 11,046,572 B2 * | 6/2021 | Edwards | B67D 1/1238 |
| 11,136,232 B2 * | 10/2021 | Park | B67D 1/08 |
| 11,144,792 B2 * | 10/2021 | Jin | B67D 1/0884 |
| 11,186,475 B2 * | 11/2021 | Kim | B67D 1/0081 |
| 11,297,975 B2 * | 4/2022 | Yoo | A47J 31/4482 |
| 11,339,047 B2 * | 5/2022 | Chernov | G01F 22/00 |
| 11,518,666 B2 * | 12/2022 | Park | B67D 1/0888 |
| 2010/0175783 A1 * | 7/2010 | Kim | F25D 29/00 |
| | | | 141/198 |
| 2015/0305548 A1 * | 10/2015 | Girault | G06K 19/06168 |
| | | | 99/283 |
| 2020/0231426 A1 † | 7/2020 | Edwards | |
| 2020/0377356 A1 * | 12/2020 | Kim | B67D 1/1405 |
| 2021/0001367 A1 | 1/2021 | Han et al. | |
| 2021/0024342 A1 * | 1/2021 | Kim | B67D 1/0081 |

FOREIGN PATENT DOCUMENTS

| | | |
|---|---|---|
| JP | 2003095393 | 4/2003 |
| KR | 10-0832237 | 5/2008 |
| KR | 10-2008-0078487 | 8/2008 |
| KR | 10-2018-0109259 | 10/2018 |
| KR | 10-1977676 | 5/2019 |
| KR | 10-2020-0124135 | 11/2020 |

OTHER PUBLICATIONS

Korean Office Action dated Apr. 26, 2023 issued in Application No. 10-2020-0175281.

\* cited by examiner
† cited by third party

LIQUID DISPENSING DEVICE AND METHOD FOR CONTROLLING THE SAME

CROSS-REFERENCE TO RELATED APPLICATION

This application claims priority to and the benefit of Korean Patent Application No. 10-2020-0175281, filed in Korea on Dec. 15, 2020, the disclosure of which is incorporated herein by reference in its entirety.

BACKGROUND

1. Field

The present disclosure relates to liquid dispensing device such as a water purifying device and a method for controlling the same, and specifically, a water purifying device, capable of detecting a height of the inlet of a container and a level of purified water contained in the container, and a method for controlling the same.

2. Background

Water purifying devices purify water, using a filter. An ordinary water purifier is a typical water purifying device. Additionally, all or part of a water purifying device is disposed on the front surface of a refrigerator to supply purified water.

In recent years, a water purifying device, in which a level of water discharged into a container is adjusted based on one-time manipulation such that the water is automatically supplied up to a predetermined water level, has been developed. To automatically supply the water up to the predetermined water level, a height of the container and a level of the water contained in the container need to be detected accurately. Against this backdrop, research has been conducted into technologies for detecting a height of a container and a level of the water contained in the container accurately and efficiently.

Disclosed are KR Patent No. 10-1977676 (hereinafter "related art 1"), KR Patent Publication No. 10-2018-0109259 (hereinafter "related art 2"), and KR Patent No. 10-0832237 (hereinafter "related art 3"), as related arts.

FIG. 1 is a view showing a structure of a water supplying device of related art 1. FIG. 1 is excerpted from FIG. 2 of related art 1. Reference numerals in FIG. 1 are limited only to the components in FIG. 1.

Referring to FIG. 1, the water supplying device in related art 1 uses two different ultrasonic sensors (i.e., transmitting and receiving parts) to measure both a height of a cup 10 and a level of the water contained in the container.

Specifically, a first transceiver 21 transmits a first ultrasonic signal to and receives the same from the rim of the upper portion of the cup 10 placed on a holding part 11, and a second transceiver 22 transmits a second ultrasonic signal to and receives the same from the inside of the cup 10 placed on the holding part 11. The first transmitting and receiving part 21 is disposed at a water supplier 13 side that faces the rim of the upper portion of the cup 10, and the second transmitting and receiving part is disposed at a water supplier 13 side that faces the inside the cup 10.

In this case, a cup height measuring part 26 of controller 28 measures a height of the cup 10 by deducting a second height L2 (i.e., a height between the first transmitting and receiving part 21 and the upper portion of the cup 10) from a first height L1 (i.e., a height between the holding part 11 and the water supplier 13). Additionally, a water height measuring part 27 measure a height of water by deducting a third height L3 (i.e., a height between the second transmitting and receiving part 22 and the inside of the cup 10) from the first height.

FIG. 2 is a view showing a structure of a water purifier of related art 2. FIG. 2 is excerpted from FIGS. 4 and 5 of related art 2. Reference numerals in FIG. 2 are limited only to the components in FIG. 2.

Referring to FIG. 2, the water purifier 10 with a dispenser 121 in related art 2 uses a sensor 12 with two different ultrasonic sensors having different transmission angles (beam angles) to measure both a height of a container 1 and a water level (i.e., a height of water) in the container. Specifically, a wide-angle ultrasonic sensor 17, 173 includes a transmitter 171 and a receiver 172 and measures a height of the container 1, and a narrow-angle ultrasonic sensor 18 measures a height of water in the container 1.

The wide-angle ultrasonic sensor 17 and the narrow-angle ultrasonic sensor 18 that have different transmission angles are used, because sensing properties of a height of a container and a water level differ. That is, when water is supplied, a height of a container does not change, while a water level changes. In related art 2, since two different ultrasonic sensors having different transmission angles (beam angles) are used, a height of a container and a water level are measured without causing interference.

However, in related art 1 and 2, two ultrasonic sensors are used, causing an increase in the production costs of a water purifier. Additionally, a user can place a cup or a container in any position of a tray when water is supplied. If the user places the cup or the container at a left end or a right end of the tray, ultrasonic waves transmitted by the ultrasonic sensor that measures a height of water cannot be reflected from the water, and the ultrasonic sonic sensor fails to measure a height of the water.

FIG. 3 is a view showing a structure of a water purifier of related art 3. FIG. 3 is excerpted from FIGS. 3b and 3c of related art 3. Reference numerals in FIG. 3 are limited only to the components in FIG. 3.

Referring to FIG. 3, an automatic liquid distributor 400 includes a single transmission ultrasonic transducer 410, and two receipt ultrasonic transducers 421, 422. Gains of the two receipt ultrasonic transducers 421, 422 differ.

In this case, when a container 310 is placed below a dispenser, the transmission ultrasonic transducer 410 transmits ultrasonic waves onto the upper surface of the container 310, and the two receipt ultrasonic transducers 421, 422 receive the ultrasonic waves reflected from the upper surface 310a of the container 310. Accordingly, a height of the container 310 is measured.

When water 340 is discharged to the container 310, the transmission ultrasonic transducer 410 transmits ultrasonic waves to the upper surface 340a of the water 340, and one of the two receipt ultrasonic transducers 421, 422 receives the ultrasonic waves reflected from the upper surface of the water 340. Accordingly, a height of water is measured.

However, in related art 3, a height of a container having a narrow inlet and a narrow inlet rim cannot be sensed accurately.

BRIEF DESCRIPTION OF THE DRAWINGS

Embodiments will be described in detail with reference to the following drawings in which like reference numerals refer to like elements, and wherein.

DETAILED DESCRIPTION

Figure 1:
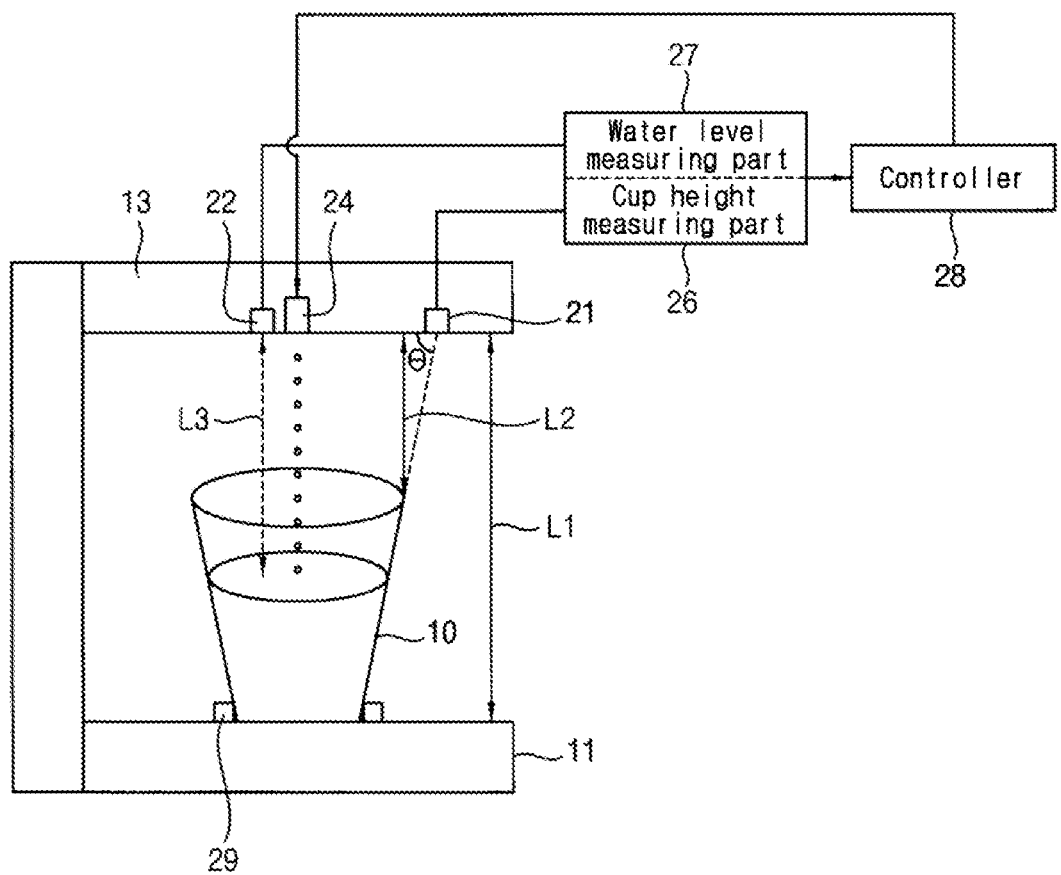
FIGS. 1 to 3 are views showing a structure of a device of the related art.
Figure 2:
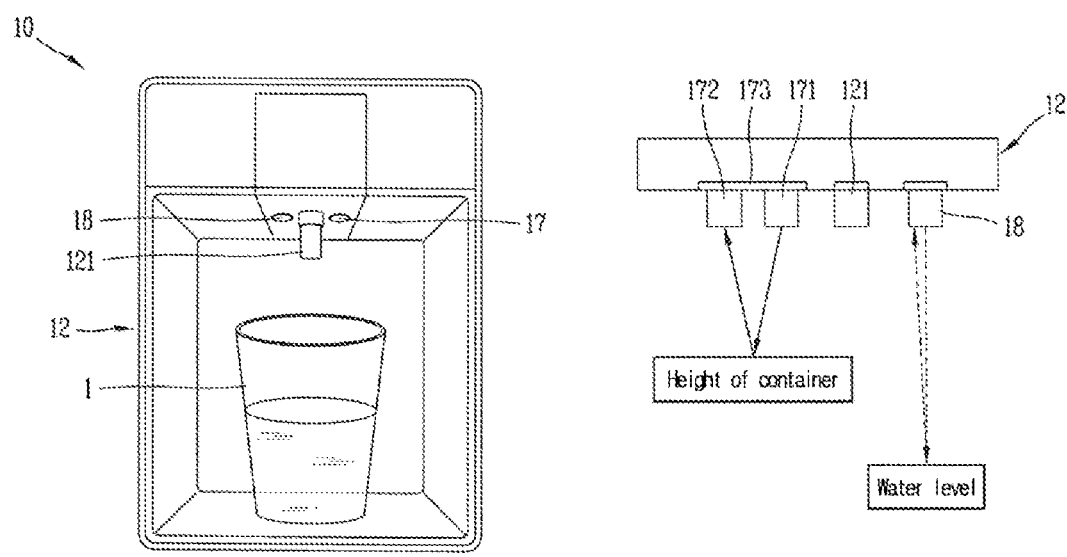
Figure 3:
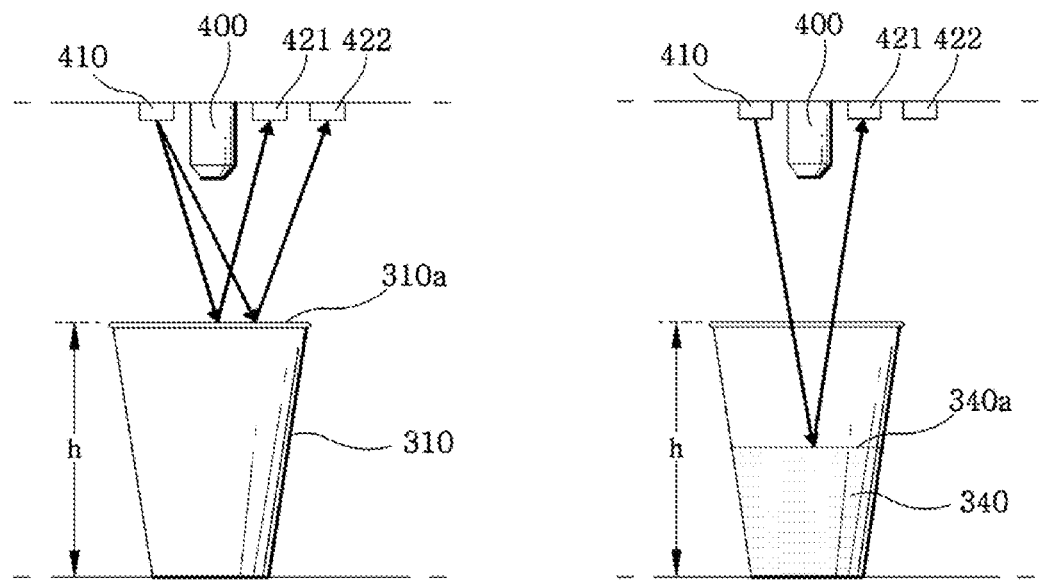

The above-described aspects, features and advantages are specifically described hereunder with reference to the accompanying drawings such that one having ordinary skill in the art to which the present disclosure pertains can easily implement the technical spirit of the disclosure. In the disclosure, detailed descriptions of known technologies in relation to the disclosure are omitted if they are deemed to make the gist of the disclosure unnecessarily vague. Below, preferred embodiments according to the disclosure are specifically described with reference to the accompanying drawings. In the drawings, identical reference numerals can denote identical or similar components.

When any one component is described as being "in an upper portion (or a lower portion)" of another component, or "on (or under)" another component, any one component can be placed on the upper surface (or the lower surface) of another component, and an additional component can be interposed between any one component and another component.

It is to be understood that when any one component is "connected," "coupled" or "connected" to another component, any one component can be directly "connected," "coupled," and "connected" to another component or "connected", "coupled", and "connected" to another component through an additional component.

Hereinafter, a water purifying device in several embodiments and a method for controlling the same are described.

The water purifying device in one embodiment is a device that purifies water using a filter, and usually implemented as an ordinary water purifier, a water purifying device installed on a front surface of a refrigerator, a water ionizer and the like.

For convenience of description, under the assumption that the water purifying device is an ordinary water purifier, embodiments in the disclosure are described. However, embodiments are not limited to the embodiments set forth herein.

Figure 4:
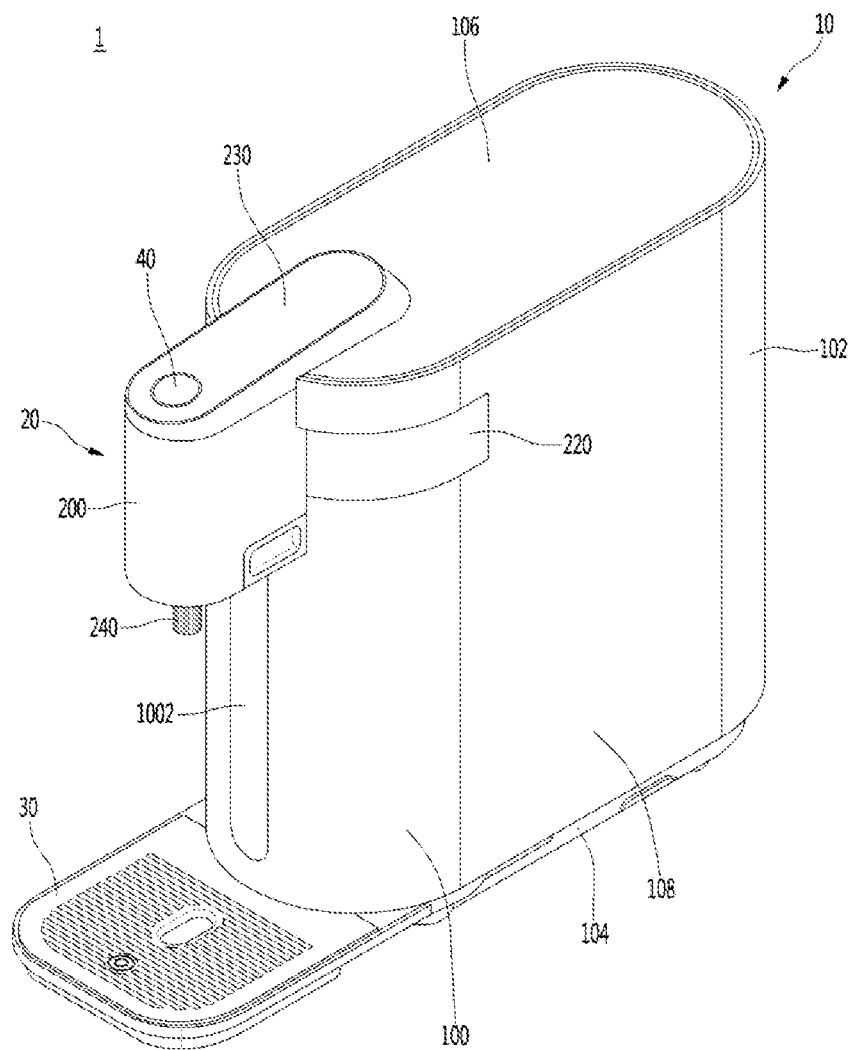
FIG. 4 is a perspective view showing a water purifier in one embodiment.

FIG. 4 is a perspective view showing a water purifier (or liquid dispensing device) 1 in one embodiment. Referring to FIG. 4, the water purifier 1 in one embodiment may include a main body 10 and a water discharge module 20.

The main body 10 is a main component of the water purifier 1 that produces purified water, hot water and cool water by filtering raw water. The main body 10 may include a main body case that forms an exterior of the water purifier 1, and various types of components that filter raw water. The main body case may have an inner space therein, and various types of components that filter raw water are installed in the inner space.

The main body case may be formed in a way that a plurality of covers 100, 102, 104, 106, 108 are coupled. Specifically, the main body case may include a front cover 100, a rear cover 102, a base cover 104, a top cover 106 and a pair of side covers 108. The covers 100, 102, 104, 106, 108 constituting the main body case may form an exterior of a front surface, a rear surface, a bottom surface, an upper surface and both lateral surfaces of the main body 10.

The covers 100, 102, 104, 106, 108 constituting the main body case may be coupled to one another using a coupling member or a coupling structure. Specifically, the front cover 100 and the rear cover 102 may be spaced from each other in a front-rear direction. The pair of side covers 108 may respectively connect to the front cover 100 and the rear cover 102. The top cover 106 may be coupled to upper ends of the front cover 100, the rear cover 102, and the pair of side covers 108. The base cover 104 may be coupled to lower ends of the front cover 100, the rear cover 102, and the pair of side covers 108. The base cover 104 may be a cover that is mounted onto a floor surface on which the water purifier 1 is disposed.

The front cover 100 and the rear cover 102 may be formed in a way that the front cover 100 and the rear cover 102 are bent at a predetermined curvature, and the pair of side covers 108 may be formed into a flat plate. The base cover 104 and the top cover 106 may have a front end and a rear end that are rounded, to correspond to the front cover 100 and the rear cover 102.

A flat surface part 1002 may be formed in a central portion of the front cover 100 in an up-down direction. The flat surface part 1002 may be a dent portion of the front cover 100 that convexly protrudes forward. The flat surface part 1002 may serve as a center point at a time of rotation of the water discharge module 20 described hereunder. A container such as a cup and the like for collecting water may be disposed in front of the front cover 100. The container may be disposed more reliably with the formed flat surface part 1002.

The water purifier 1 may further include a tray 30 onto which the container is mounted. The tray 30 may connect to the base cover 104 and protrude forward. Together with the base cover 104, the tray 30 may form the lower surface of the water purifier 1. The tray 30 may be disposed below a water discharge nozzle 240 described hereunder perpendicularly. The tray 30 may be formed as a structure for storing water that falls down without being accommodated in the container.

The water discharge module 20 may be coupled to and protrude from one side of the main body 10. Specifically, the water discharge module 20 may be disposed to protrude forward from the front cover 100 and the top cover 106. The water discharge module 20 may be coupled to and communicate with the main body 10. At least a portion of the water discharge module 20 may move in the up-down direction, and discharge purified water, hot water and cool water to the container.

The water discharge module 20 may include a water discharge module case forming an exterior of the water discharge module 20. The water discharge module case may include a water discharge top cover 230, a water discharge lifting cover 200, 210 and a water discharge side cover 220.

The water discharge side cover 220 may be a cover that is mounted onto the main body 10. The water discharge side cover 220 may be disposed in a way that the front cover 100 is divided into an upper portion and a lower portion. Accordingly, the front cover 100 may be divided into a lower front cover 1000 coupled to the base cover 104, and an upper front cover 1004 coupled to the top cover 106.

The water discharge lifting cover 200, 210 may be disposed to protrude from the front cover 100 forward. The water discharge lifting cover 200, 210 may be disposed to protrude from the water discharge side cover 220 outward.

The water discharge top cover 230 may extend from the top cover 106 and be disposed to cover an upper end of the water discharge lifting cover 200, 210. An input part 40 for allowing a user to input an instruction for a predetermined operation may be disposed on the water discharge top cover 230. The input part 40 may be implemented as a variety of forms such as a button-type input part, a touch-type input part and the like.

The water discharge module 20 may include a water discharge nozzle 240 that discharges purified water, cool water and hot water. The water discharge nozzle 240 may be installed in a way that the water discharge nozzle 240 is exposed to a lower surface of the water discharge module 20. The tray 30 may be disposed below the water discharge nozzle 240 perpendicularly.

A water discharge pipe (not illustrated) connected to the water discharge nozzle 240 may be disposed inside the water discharge module 20. The water discharge pipe may extend to an inside of the water discharge module 20, in the main body 10, and be coupled to the water discharge nozzle 240.

In one embodiment, the water discharge module 20 may move such that a position of the water discharge nozzle 240 changes.

Figure 5:
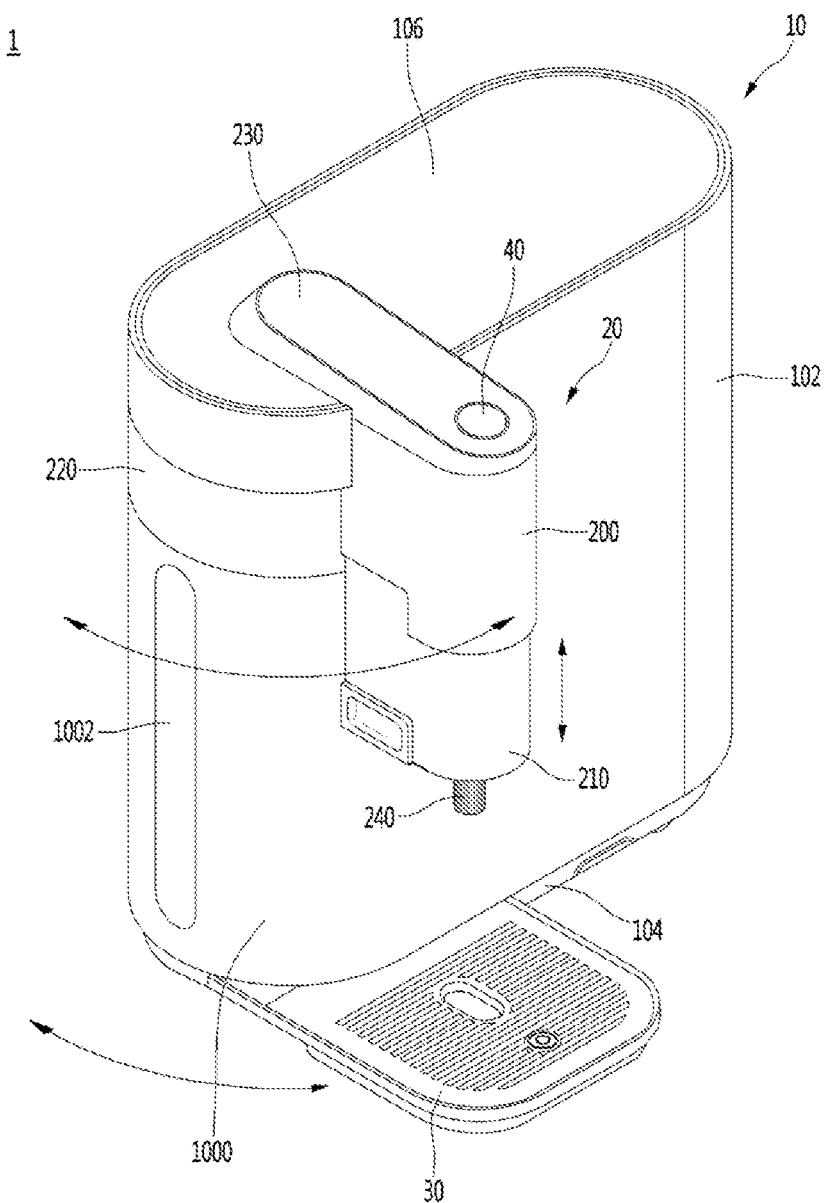
FIG. 5 is a perspective view showing the water purifier in which a position of a water discharge nozzle changes, in one embodiment.

FIG. 5 is a perspective view showing the water purifier 1 in which a position of a water discharge module 20 changes, in one embodiment. Referring to FIG. 5 the water discharge module 20 may rotate or move up and down. That is, the water discharge module 20 may move in the horizontal direction (i.e., left-right direction) and vertical direction (i.e., the up-down direction). Accordingly, the water discharge nozzle 240 may also rotate or vertically. Additionally, the tray 30 may rotate based on rotation of the water discharge nozzle 240.

The rotation of the water discharge module 20 is described as follows.

As the water discharge side cover 220 rotates, the water discharge module 20 including the water discharge lifting cover 200, 210, the water discharge top cover 230 and the water discharge nozzle 240 may rotate. In this case, the water discharge module 20 may rotate along the front cover 100 at about 180 degrees. Additionally, since the input part 40 is formed on the water discharge top cover 230, the input part 40 may rotate together with the water discharge module 20. The tray 30 may be rotatably coupled to the base cover 104, and in response to the water discharge module 20, rotate at about 180 degrees.

The vertical movement of the water discharge module 20 is described as follows. The water discharge lifting cover 200, 220 may include a first lifting cover 200, and a second lifting cover 210.

The first lifting cover 200 may be fixed to the water discharge side cover 220. That is, the first lifting cover 200 does not move in the up-down direction. The water discharge top cover 230 may be coupled to an upper end of the first lifting cover 200.

The second lifting cover 210 may be disposed in the first lifting cover 200 and move in the up-down direction along the first lifting cover 200. The water discharge nozzle 240 may be disposed on a lower surface of the second lifting cover 210 and move in the up-down direction together with the second lifting cover 210.

As illustrated in the following drawing, a sensor for measuring a distance may be further disposed on the second lifting cover 210. The sensor may be disposed on the lower surface of the second lifting cover 210, for example. The sensor may transmit a distance measuring signal for sensing a height of a container (i.e., a height of the inlet of the container) and a height of the water contained in the container (i.e., a water level), and receive a signal at which the distance measuring signal is reflected. As the second lifting cover 210 moves vertically, the sensor may move vertically.

In an example, the sensor may be an ultrasonic sensor 270. Hereinafter, under the assumption that the sensor in the disclosure is an ultrasonic sensor 270, the embodiments in the disclosure are described, for convenience of description. However, the sensor is not limited. The ultrasonic sensor 270 is specifically described with reference to FIG. 11.

The rotation movement and the vertical movement of the water discharge module 20 may be performed independently. That is, the rotation and the vertical movement of the water discharge module 20 may be performed simultaneously or individually. In an example, the rotation of the water discharge module 20 may be performed based on a shape of a place in which the water discharge module 20 is installed, and the vertical movement of the water discharge module 20 may be performed based on a height of a container (i.e., a height of the inlet of the container) or a height of the water contained in the container (i.e., a water level).

Figure 6:
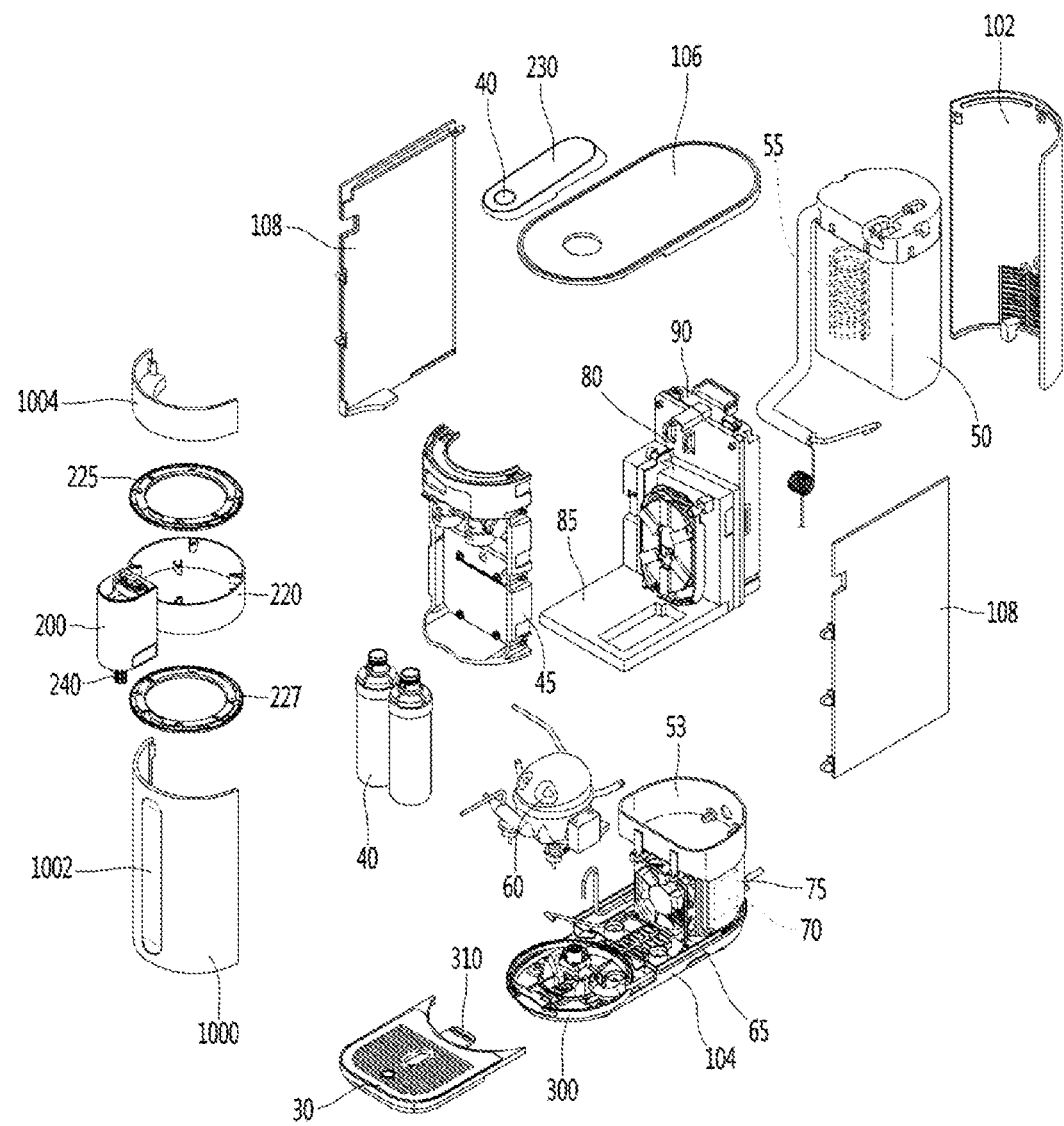
FIG. 6 is an exploded perspective view showing the water purifier in one embodiment.

Hereinafter, a configuration in the water purifier 1 is specifically described. FIG. 6 is an exploded perspective view showing the water purifier 1 in one embodiment. The water purifier 1 in FIG. 6 is provided as an example. The configuration of the water purifier 1 is not limited, and specific components may be omitted or added. Additionally, in FIG. 6, a pipe through which water flows is omitted for convenience of description.

Referring to FIG. 6, the water purifier 1 may include a filter 40, a filter bracket 45, a cooling tank 50, a compressor 60, a condenser 70 and an induction heating assembly 80. The filter bracket 45 may be disposed near the front cover 100, and mounted onto the base cover 104. The water discharge side cover 220 may be mounted onto the filter bracket 45.

The filter 40 may be disposed in a space formed between the filter bracket 45 and the front cover 100. The filter bracket 45 may be depressed rearward to accommodate the filter 40. The filter 40 may filter raw water provided to generate purified water, and configured in a way that filter members having various functions are combined.

The raw water filtered by the filter 40 may be supplied to any one of the cooling tank 50, the induction heating assembly 80, and the water discharge nozzle 240. That is, the raw water filtered by the filter 40 may be supplied to the user in the form of cool water, hot water and purified water.

The compressor 60 and the condenser 70, with an evaporator 55 disposed in the cooling tank 50, may form a cooling cycle. A cooling fan 65 may be disposed between the compressor 60 and the condenser 70. The cooling fan 65 may cool the compressor 60 and the condenser 70. The compressor 60 and the condenser 70 may be mounted onto the base cover 104.

The condenser 70 may be disposed in a position corresponding to a position of a discharge opening formed on the rear cover 102. The condenser 70 may have a shape in which a flat tube-type refrigerant pipe is bent a plurality of times. The condenser 70 may be accommodated in a condenser bracket 75. For the condenser 70 to cool effectively, portions of the condenser bracket 75, which face the cooling fan 65 and the discharge opening of the rear cover 102, may be respectively open.

A tank mounting part 53 that accommodates the cooling tank 50 may be disposed on the condenser bracket 75. The cooling tank 50 cools the raw water filtered, i.e., purified water, to produce cool water, and to this end, is filled with cooling water. The evaporator 55 for cooling water is installed in the cooling tank 50.

The induction heating assembly 80 may heat the purified water using an induction heating method. The induction heating assembly 80 may be mounted onto a support plate 85. The support plate 85 may extend from the filter bracket 45 to the cooling tank 50. The support plate 85 may be disposed above the compressor 60.

The water purifier 1 further includes a controller 90. The controller 90 may control the components described above to control operation of the water purifier 1. Specifically, the controller 90 is configured to control the compressor 60, the cooling fan 65, various types of valves, the sensor, the induction heating assembly 80 and the like.

In particular, the controller 90 may control operation of the ultrasonic sensor described below, control an upward movement and a downward movement of the water discharge module 20, and perform calculation for detecting a height of the inlet of a container and a water level based on distance data sensed by the ultrasonic sensor.

The controller 90 may be a processor-based device, and for example, may be a micom. Herein, the processor may include one or more of a central processing unit (CPU), an application processor, or a communication processor.

The water purifier 1 further includes a rotation mounting part 225, 227 for rotating the water discharge module 20. The rotation mounting part 225, 227 may be coupled to the water discharge side cover 220, and formed into a ring having an outer diameter corresponding to an outer diameter of the water discharge side cover 220. The rotation mounting part 225, 227 includes an upper rotation mounting part 225 that is coupled to an upper end of the water discharge side cover 200, and a lower rotation mounting part 227 that is coupled to a lower end of the water discharge side cover 200. The lower rotation mounting part 227 may be fixed to an upper end of the filter bracket 45. The upper rotation mounting part 225 may be fixed to a lower end of the upper front cover 1104.

The water purifier 1 further includes a tray mounting part 300 for rotating the tray 300. The tray mounting part 300 may be fixed to the base cover 104, and formed into a ring having an outer diameter corresponding to an outer diameter of the front end of the base cover 104. The tray mounting part 300 may be detachably hook-coupled to a tray hook 310.

Figure 7:
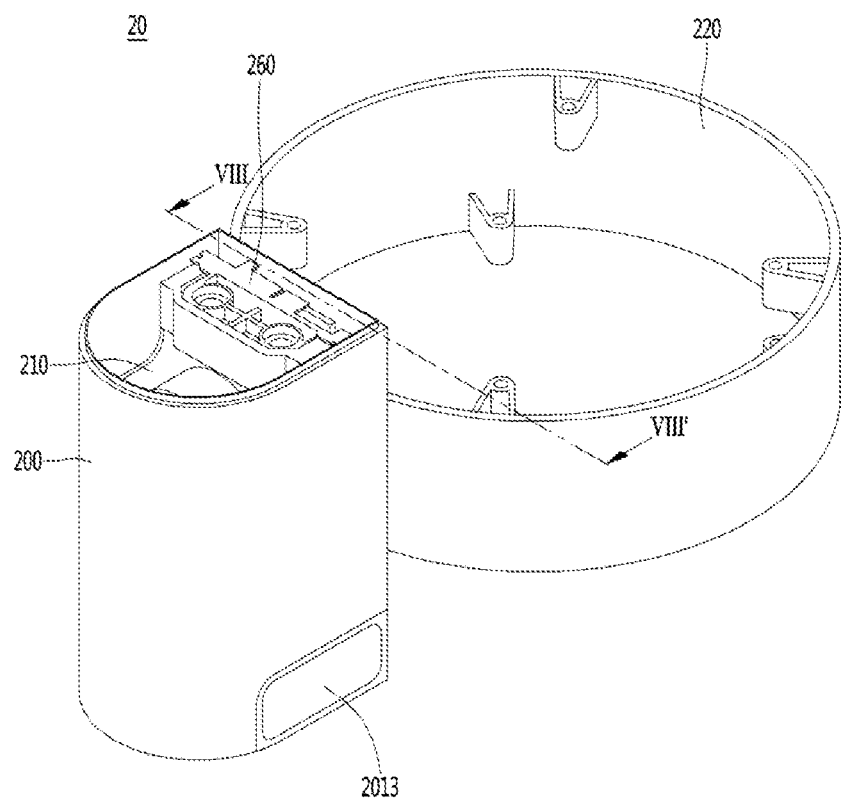
FIG. 7 is a perspective view showing a water discharge module in one embodiment.
Figure 8:
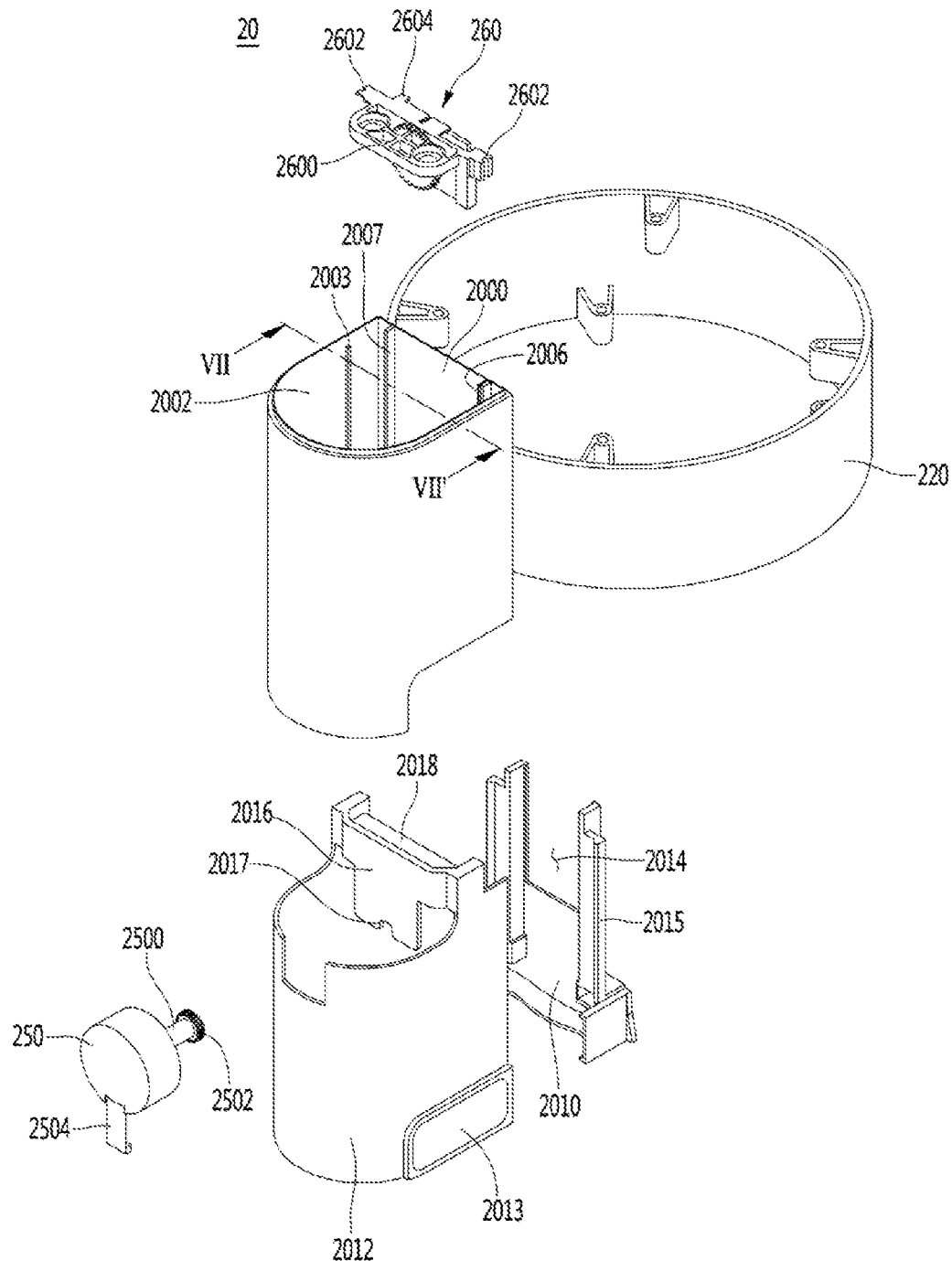
FIG. 8 is an exploded perspective view showing the water discharge module in one embodiment.
Figure 9:
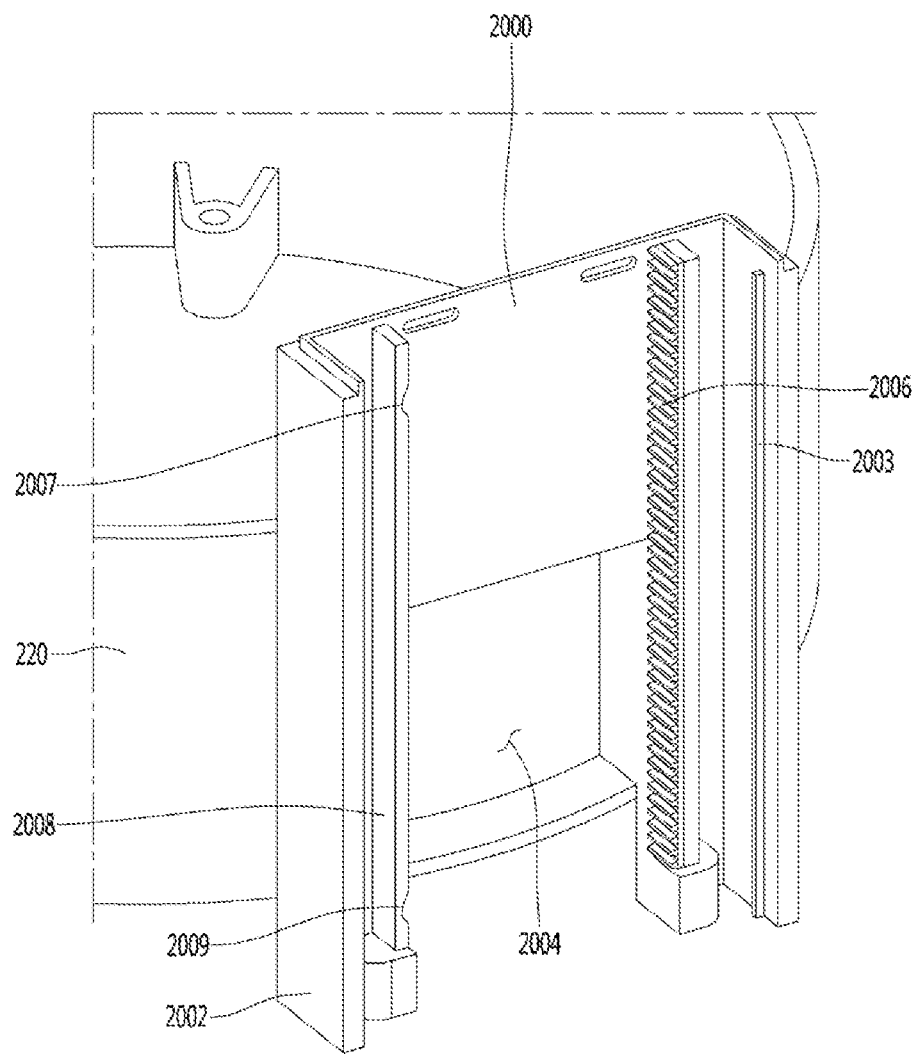
FIG. 9 is a view showing a cross section VII-VII' in FIG. 7.
Figure 10A:
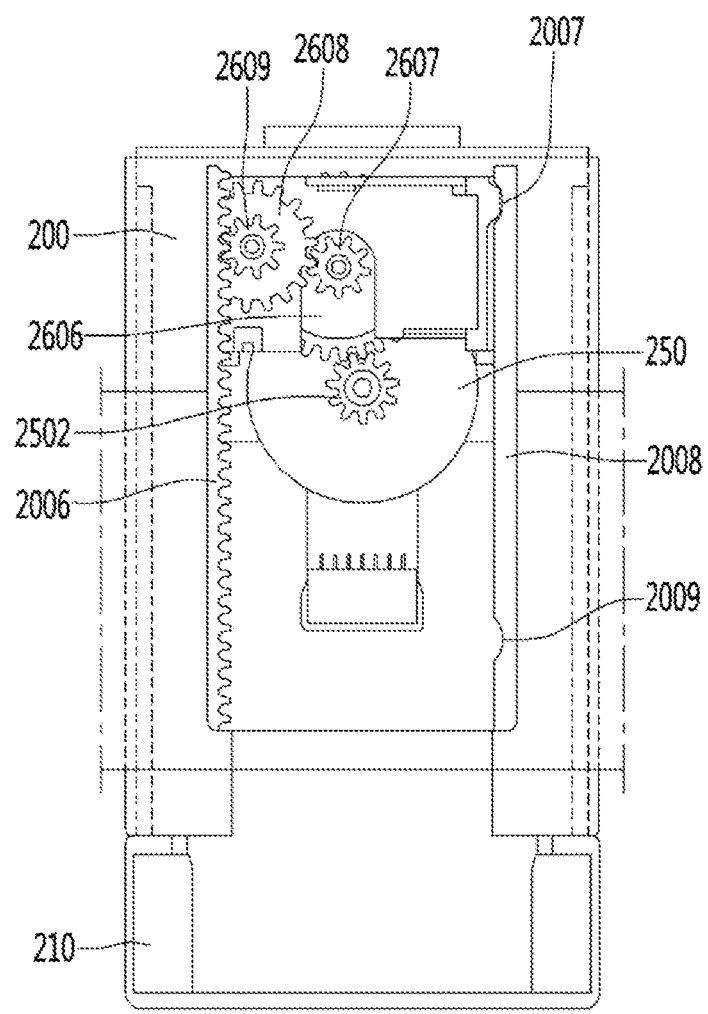
FIGS. 10a and 10b are views showing a cross section VIII-VIII' in FIG. 8 together with a movement of a second lifting cover.
Figure 10B:
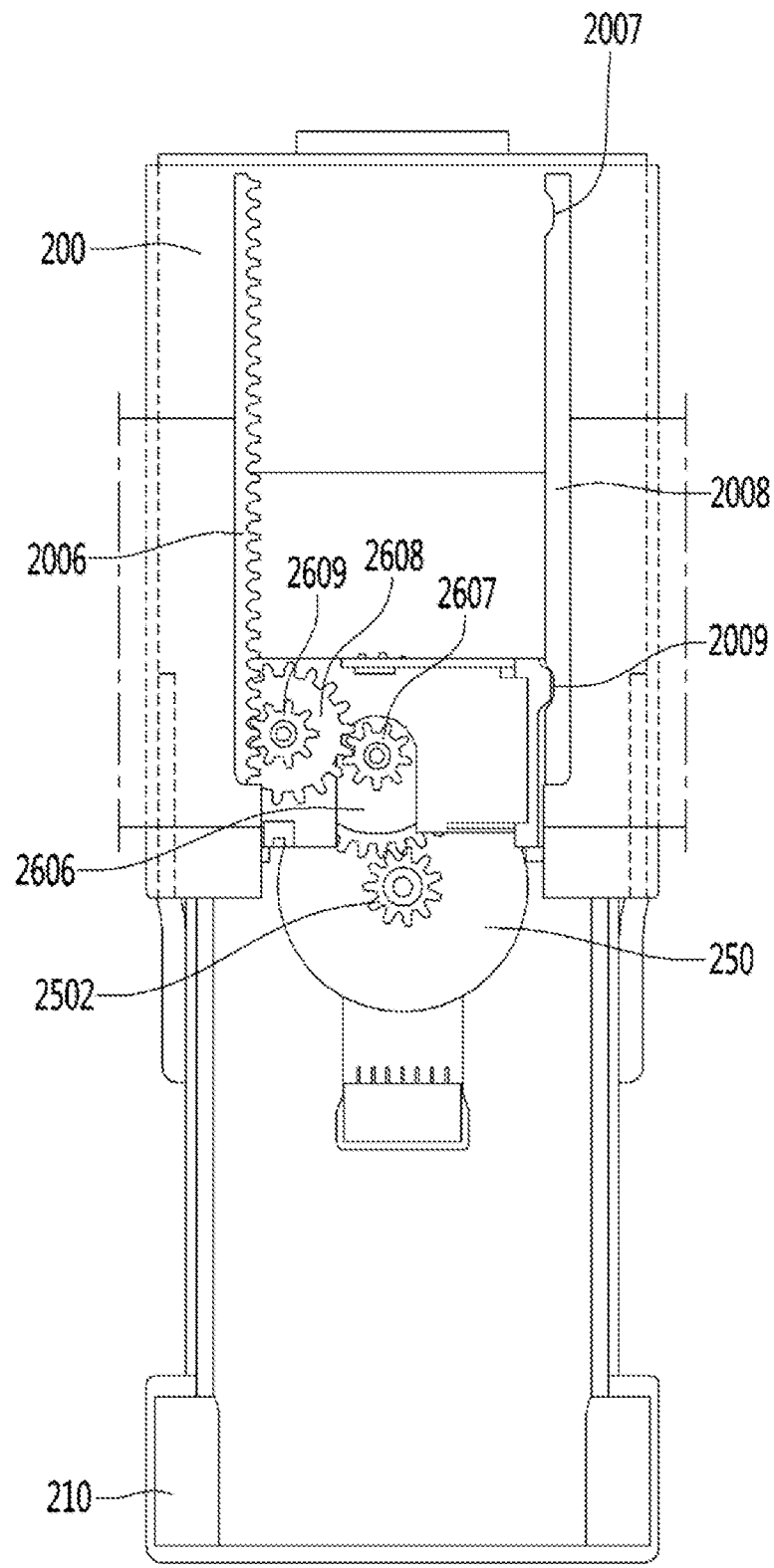
Figure 11:
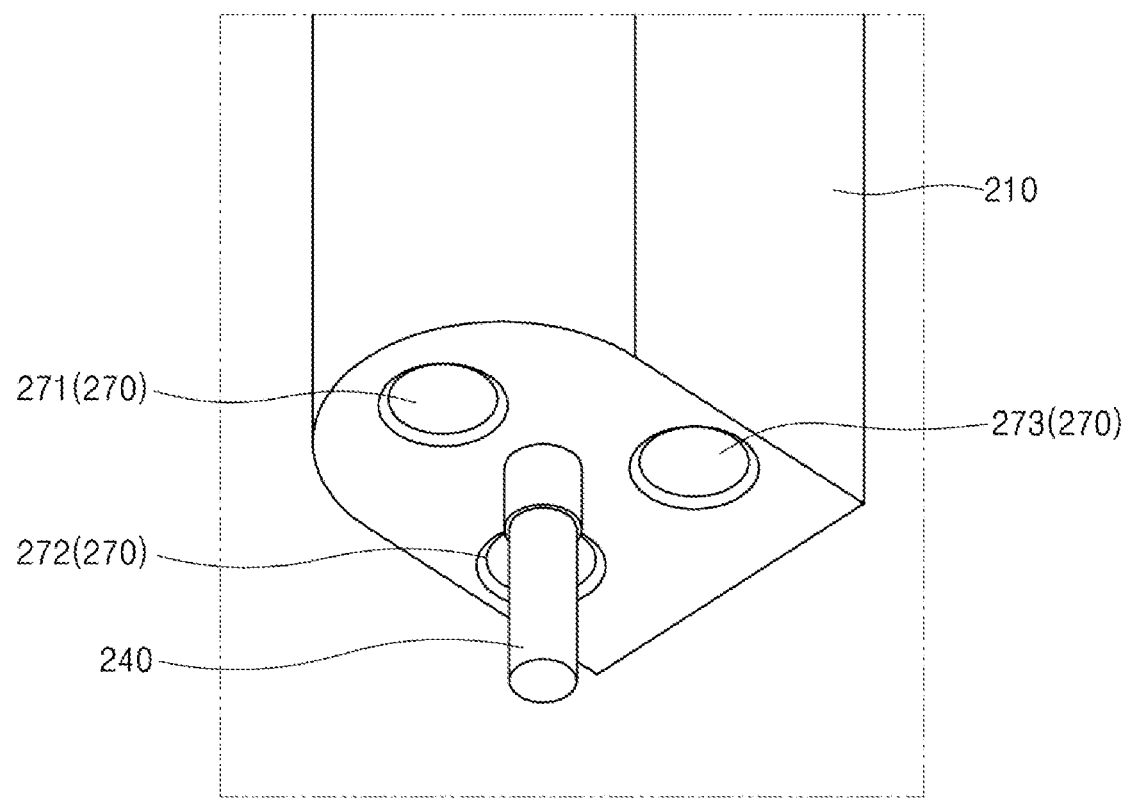
FIG. 11 is a view showing a lower surface of the water discharge module in one embodiment.

Hereunder, a moving structure of the water discharge module 20 is described specifically. FIG. 7 is a perspective view showing a water discharge module 20 in one embodiment, FIG. 8 is an exploded perspective view showing the water discharge module 20 in one embodiment, FIG. 9 is a view showing a cross section VII-VII' in FIG. 7, and FIG. 10 is a view showing a cross section VIII-VIII' in FIG. 8 together with a movement of a second lifting cover 210. FIG. 11 is a view showing a lower surface of the water discharge module 20 in one embodiment.

In FIGS. 7 to 10, the water discharge nozzle 240 and the sensor are not illustrated for convenience of description. As described above, the first lifting cover 200 may be fixed in the up-down direction, and the second lifting cover 210 may move in the up-down direction. However, the above configuration of the first and second lifting covers 200, 210 is provided as an example. The first and second lifting covers 200, 210 may be configured to move relatively in various ways. In an example, the first and second lifting covers 200, 210 may all move in the up-down direction.

The first lifting cover 200 may include a first plate 2000 coupled to the water discharge side cover 220 and a second plate 2002 extended from the first plate 2000. A water discharge opening 2004 communicating with the inner space of the case 10 may be formed on the first plate 2000. A through hole corresponding to the water discharge opening 2004 may be formed at the water discharge side cover 220. The water discharge opening 2004 corresponds to a hole through which a water discharge pipe extended to the water discharge nozzle 240 passes.

A lifting gear 2006 and a guide rail 2008 may be formed in a way that protrudes from an inner surface of the first plate 2000. The lifting gear 2006 and the guide rail 2008 may extend perpendicularly from an upper end of the first plate 2000 to a lower end thereof. The lifting gear 2006 and the guide rail 2008 may be respectively disposed on both sides of the water discharge opening 2004.

The lifting gear 2006 may include gear teeth that extends in the up-down direction. The gear teeth may be formed on a left side of the first plate 2000 to face the water discharge opening 2004.

The guide rail 2008 may be formed into a rod. A plurality of mounting grooves 2007, 2009 may be formed on a right surface of the guide rail 2008 facing the lifting gear 2006. The plurality of mounting grooves 2007, 2009 may include first and second mounting grooves 2007, 2009. A distance between the first mounting groove 2007 and the second mounting groove 2009 may correspond to a distance moved by the second lifting cover 210.

The second plate 2002 may be coupled to both ends of the first plate 2000 in a bent shape. Accordingly, a predetermined space in which an upper portion and a lower portion are open may be formed between the first plate 2000 and the second plate 2002. That is, upper and lower portions of the first lifting cover 200 may be open. The upper portion of the first lifting cover 200 may be coupled to and closed by the water discharge top cover 230, and the lower portion of the first lifting cover 200 may be closed by the second lifting cover 210.

A guide projection 2003 that protrudes in a lateral direction may be formed on an inner surface of the second plate 2002. The guide projection 2003 may be formed in a way extends from an upper end of the second plate 2002 to a lower end thereof in the up-down direction.

The second lifting cover 210 may be disposed inside the first lifting cover 200. That is, the second lifting cover 210 may be disposed in a space formed by the first plate 2000 and the second plate 2002. The second lifting cover 210 may move in the up-down direction inside the first lifting cover 200.

The second lifting cover 210 has a shape corresponding to a shape of the first lifting cover 200. The second lifting cover 210 includes a third plate 2010 and a fourth plate 2012. A predetermined space may be formed between the third plate 2010 and the fourth plate 2012. An upper end of the second lifting cover 210 may be open, and may be cut into a predetermined shape for coupling with a lifting motor 250 and a gear module 260 described below.

The water discharge nozzle 240 may be installed in a lower portion of the second lifting cover 210. In an example, the second lifting cover 210 may be provided with an opening into which the water discharge nozzle 240 is fitted and coupled, on a lower surface thereof. Additionally, the ultrasonic sensor described below maybe installed in the lower portion of the second lifting cover 210. Description in relation to this is provided below.

A water discharge groove 2014 corresponding to the water discharge opening 2004 may be formed at the third plate 2010. The water discharge groove 2014 may be formed in a position corresponding to a position of the water discharge opening 2004 in a state in which the second lifting cover 210 moves up. Accordingly, the water discharge pipe may extend by passing through the water discharge opening 2004 and the water discharge groove 2014.

A subsidiary guide rail 2015 may be formed at the third plate 2010. The subsidiary guide rail 2015 may protrude toward both lateral surfaces of the third plate 2010 and extend in the up-down direction. The subsidiary guide rail 2015 may guide an upward movement and a downward movement of the second lifting cover 210 by contacting the guide projection 2003.

A grip part 2013 gripped by the use may be formed at the fourth plate 2012. The grip part 2013 may be disposed in a lower portion of both lateral surfaces of the second plate 2012 and have a cut shape. The user may grip the grip part 2013 to move the second lifting cover 210 in the up-down direction manually.

Additionally, the second plate 2012 may be provided with a moving bracket 2016 coupled to the lifting motor 250 and the gear module 260 that are described hereunder. The moving bracket 2016 may include a motor coupling part 2017 to which the lifting motor 250 is coupled, and a gear mounting part 2018 to which the gear module 260 is coupled.

The water discharge module 20 may further include the lifting motor 250 and the gear module 260 that interlocks with the lifting motor 250. The lifting motor 250 includes an electric wire 2504 connected to an external power source, a motor shaft 2500 configured to rotate as a result of supply of power, and a motor gear 2502 connected to the motor shaft 2500. The motor gear 2502 may be a spur gear in which gear teeth are cut in parallel with the motor shaft 2500.

The lifting motor 250 may be coupled to the motor coupling part 2017. That is, the lifting motor 250 may be coupled to the second lifting cover 210. The motor shaft 2500 may extend in a horizontal direction, and the lifting motor 250 and the second lifting cover 210 may be coupled such that the motor gear 2502 is disposed rearward.

The gear module 260 may correspond to a plurality of gears that is rotated by the lifting motor 250. The gear module 260 may include a gear bracket 2600 that rotatably fixes the plurality of gears.

The gear bracket 2600 may include a gear guide projection 2602 that protrudes respectively from both lateral surfaces of the gear bracket 2600 and contacts the guide projection 2003. A pair of gear guide projections 2602 may be spaced from each other such that the guide projection 2003 is disposed between the pair of gear guide projections. That is, the guide projection 2003 and the gear guide projection 2602 may be disposed in a state of being fitted to each other. Accordingly, the gear bracket 2600 may move in the up-down direction along the guide projection 2003.

The gear bracket 2600 includes a guide rail projection 2604 that protrudes rearward. The guide rail projection 2604 may be disposed to contact an inner surface of the guide rail 2008. Thus, the gear bracket 2600 may move in the up-down direction along the guide rail 2008.

Referring to FIG. 10, the gear module 260 may include first, second, third and fourth gears 2606, 2607, 2608, 2609 that are mounted onto the gear bracket 2600. The first gear 2606 engages with the motor gear 2402. The second gear 2607 connects to the first gear 2606 on the same axis. The third gear 2608 engages with the second gear 2607. The fourth gear 2609 connects to the third gear 2608 on the same axis.

The fourth gear 2609 engages with the lifting gear 2608. In this case, the lifting gear 2608 may be a fixed gear that is formed at the first lifting cover 200. The fourth gear 2609 may be mounted onto the gear bracket 2600 and coupled to the second lifting cover 210. Accordingly, as the fourth gear 2609 rotates, the second lifting cover 210 may move in the up-down direction.

The upward movement and the downward movement of the second lifting cover 210 are described with reference to FIGS. 10*a* and 10*b*. FIG. 10(*a*) shows the second lifting cover 210 in a state in which the second lifting cover 210 is moved up. In this case, the guide rail projection 2604 is inserted into the first mounting groove 2007. FIG. 10(*b*) shows the second lifting cover 210 in a state in which the second lifting cover 210 is moved down. In this case, the guide rail projection 2604 is inserted into the second mounting groove 2009.

Accordingly, the second lifting cover 210 may move in the up-down direction by a distance between the first and second mounting grooves 2009. Thus, the water discharge nozzle 240 and the ultrasonic sensor disposed at the second lifting cover 210 may move vertically by a distance moved by the second lifting cover 210.

FIG. 11 shows shapes of a water discharge nozzle 240 and an ultrasonic sensor 270 in one embodiment. Referring to FIG. 11, the water discharge nozzle 240 and the ultrasonic sensor 270 may be disposed on the lower surface of the water discharge module 20, i.e., the lower surface of the second lifting cover 210.

The water discharge nozzle 240 may be exposed outward from a center of the lower surface of the second lifting cover 210. The water discharge nozzle 240 connects to the water discharge pipe and discharges purified water, cool water and hot water to the container. A position in which the water discharge nozzle 240 is installed is not limited to the position in FIG. 11. The water discharge nozzle 240 may be installed in various positions of the lower surface of the second lifting cover 210.

The ultrasonic sensor 270 may include an ultrasonic transmitter 271, a first ultrasonic receiver 272 and a second ultrasonic receiver 273.

The ultrasonic transmitter 271 transmits an ultrasonic signal that is a distance measuring signal.

In one embodiment, the ultrasonic transmitter 271 may transmit an ultrasonic signal at a fixed beam angle. That is, the water purifier 1 according to the present disclosure may transmit an ultrasonic signal through the ultrasonic transmitter 271 in which an ultrasonic beam angle is fixed rather than varied.

In an example, the ultrasonic transmitter 271 may transmit an ultrasonic signal at 10° or so that is a narrow beam angle. Manufacturing costs of an ultrasonic transmitter having a narrow beam angle are less than manufacturing costs of an ultrasonic transmitter having a wide beam angle. Accordingly, in the water purifier 1 of one embodiment, the ultrasonic transmitter 271 having a narrow beam angle is combined with the vertical movement of the water discharge module 20 described below, to accurately detect a height of the inlet of the container and a height of the water contained in the container and reduce production costs of the water purifier 1.

In another embodiment, the water purifier 1 may transmit an ultrasonic signal through the ultrasonic transmitter 271 in which an ultrasonic beam angle is varied.

The first ultrasonic receiver 272 and the second ultrasonic receiver 273 receive an ultrasonic signal. The received ultrasonic signal is an ultrasonic signal at which the ultrasonic signal transmitted by the ultrasonic transmitter 271 is reflected from an object. The object from which the ultrasonic signal is reflected includes the container, the water, the tray 30 and the like.

In one embodiment, the first ultrasonic receiver 272 and the second ultrasonic receiver 273 may be disposed respectively at both sides of the ultrasonic transmitter 271. That is, the first ultrasonic receiver 272 may be disposed at one side, e.g., a right side, of the ultrasonic transmitter 271, and the second ultrasonic receiver 273 may be disposed at the other side, e.g., a left side, of the ultrasonic transmitter 271. Since the two ultrasonic receivers 272, 273 are used as described hereunder, a height of the inlet of the container and a height of the water may be detected more accurately, even if the user places the container in any positions of the tray 30.

A signal amplification ratio (i.e., a gain) of the first ultrasonic receiver 272 and the second ultrasonic receiver 273 in one embodiment may be adjusted. That is, after receiving the reflected ultrasonic signal, the first ultrasonic receiver 272 and the second ultrasonic receiver 273 may amplify the reflected ultrasonic signal such that the signal amplification ratio is adjusted.

In this case, the signal amplification ratios of the first ultrasonic receiver 272 and the second ultrasonic receiver 273 may be the same, and the signal amplification ratios of the first ultrasonic receiver 272 and the second ultrasonic receiver 273 may be adjusted based on the position of the water discharge module 20.

Specifically, when the water discharge module 20 is disposed at a first point, the first ultrasonic receiver 272 and the second ultrasonic receiver 273 may have a first signal amplification ratio that is an identical signal amplification ratio. When the water discharge module 20 is disposed at a second point, the first ultrasonic receiver 272 and the second ultrasonic receiver 273 may have a second signal amplification ratio that is an identical signal amplification ratio.

In this case, the second point may be a point below the first point, and the first signal amplification ratio may be set to be less than the second signal amplification ratio.

The signal amplification ratios of the first ultrasonic receiver 272 and the second ultrasonic receiver 273 are specifically described below.

In another embodiment, the water purifier 1 may include a single ultrasonic receiver 272 or 273. The single ultrasonic receiver 272 or 273 may be disposed at one side or the other side of the ultrasonic transmitter 271, or disposed to face the ultrasonic transmitter 271 with respect to the water discharge nozzle 240. In this case, a signal amplification ratio of the single ultrasonic receiver 272 or 273 may also be set based on the position of the water discharge module 20.

Hereafter, a method for controlling a water purifier 1 that detects a height of the inlet of a container and a height of the water contained the container and outputs purified water and the like, based on the above configurations, is described.

Figure 12:
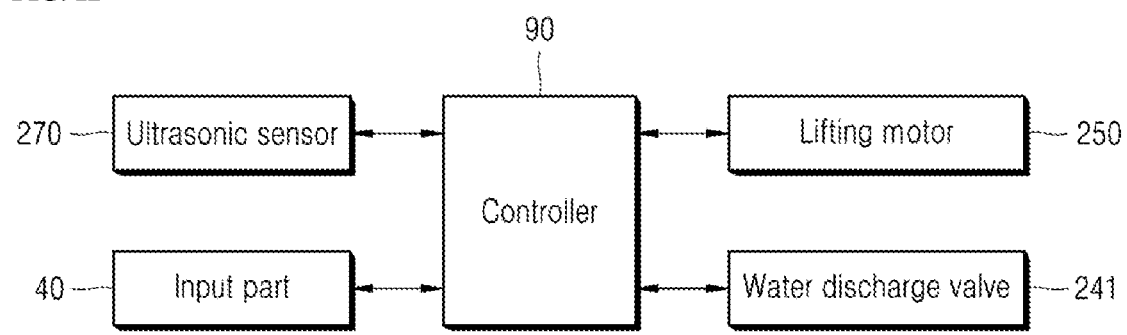
FIG. 12 is a control block diagram showing the water purifier in one embodiment.

FIG. 12 is a control block diagram showing the water purifier 1 in one embodiment. The control block diagram of FIG. 12 only shows configurations in relation to the water discharge module 20's upward movement, the ultrasonic sensor 270's sensing of distance data, and the water discharge nozzle 240's discharge of purified water and the like. Accordingly, the water purifier 1 may further include various types of components in addition to the components illustrated in FIG. 12.

Referring to FIG. 12, the water purifier 1 includes a controller 90 that is implemented by a processing device. The controller 90 controls operation of the plurality of components in the water purifier 1 and performs calculation for detecting a height of the inlet of a container and a height of the water contained in the container. The controller 90 may be disposed in the case 10, as described above. Alternatively, the controller 90 may separate from the water purifier 1.

The controller 90 may control operation of the lifting motor 250. That is, the controller 90 may drive the lifting motor 250 to move the water discharge module 20, i.e., the second lifting cover 210 in the water discharge module 20, in the up-down direction. As the second lifting cover 210 moves in the up-down direction, the water discharge nozzle 240 and the ultrasonic sensor 270 may move in the up-down direction. That is, the controller 90 may control the vertical movement of the water discharge nozzle 240 and the ultrasonic sensor 270.

The controller 90 may control operation of a water discharge valve 241. The water discharge valve 241 is a component that opens and closes the water discharge nozzle 240. That is, the controller 90 may control the water discharge module 20's water discharge operation.

The controller 90 may control the ultrasonic sensor 270's sensing operation. That is, the ultrasonic sensor 270 may transmit and receive an ultrasonic signal at a specific point, and the controller 90 may control the ultrasonic sensor 270's operation of transmitting and receiving an ultrasonic signal at a specific point. Additionally, the controller 90 may control a signal amplification ratio of the ultrasonic sensor 270.

The controller 90 may control the lifting motor 250's vertical movement, based on distance data sensed by the ultrasonic sensor 270, and a water discharge valve 94's opening and closing operation. Further, the controller 90 may control the lifting motor 250's vertical movement, based on a signal input by the input part 40, and the water discharge valve 94's opening and closing operation.

Figure 13:
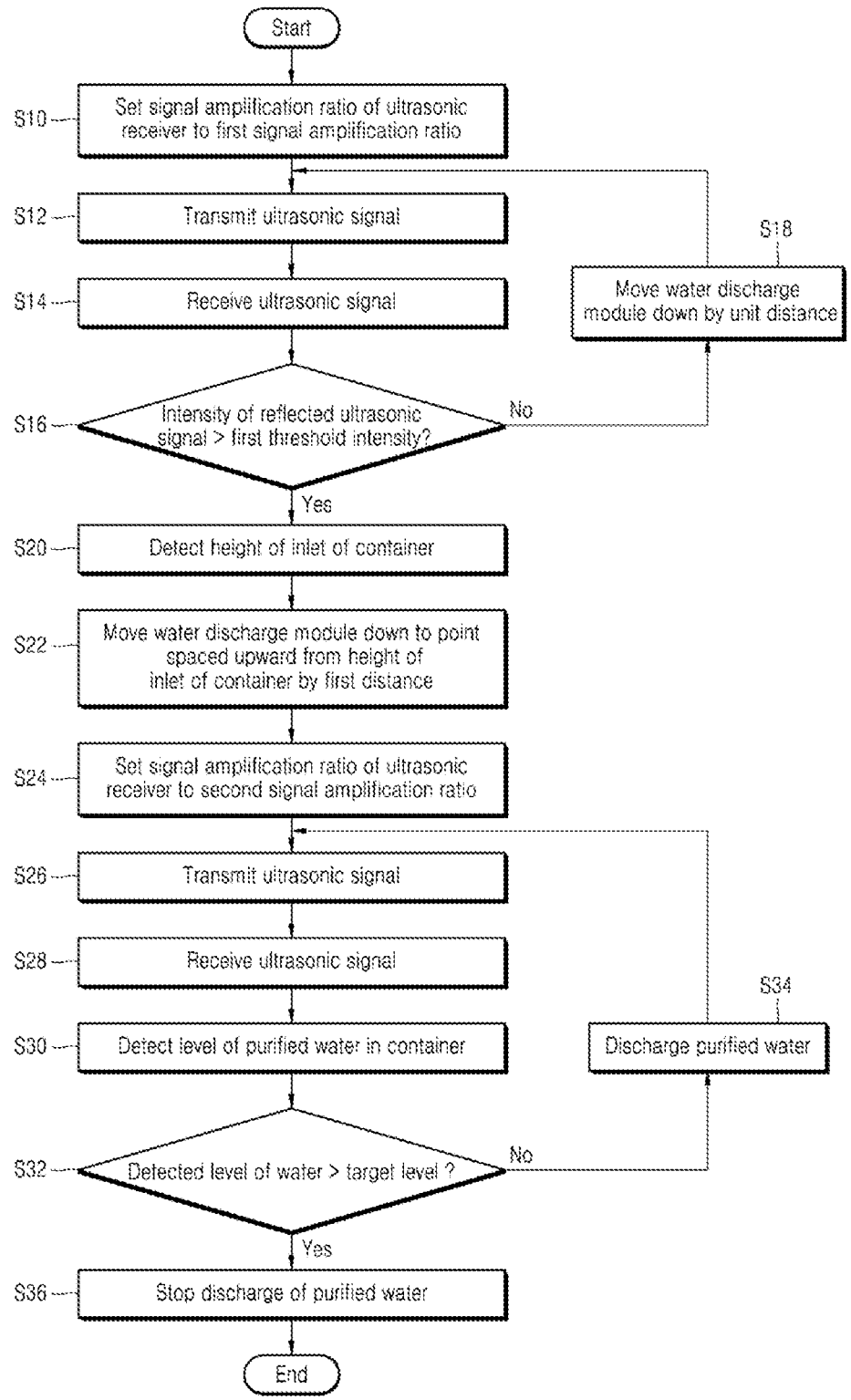
FIG. 13 is a flow chart showing a method for controlling a water purifier in one embodiment.
Figure 14:
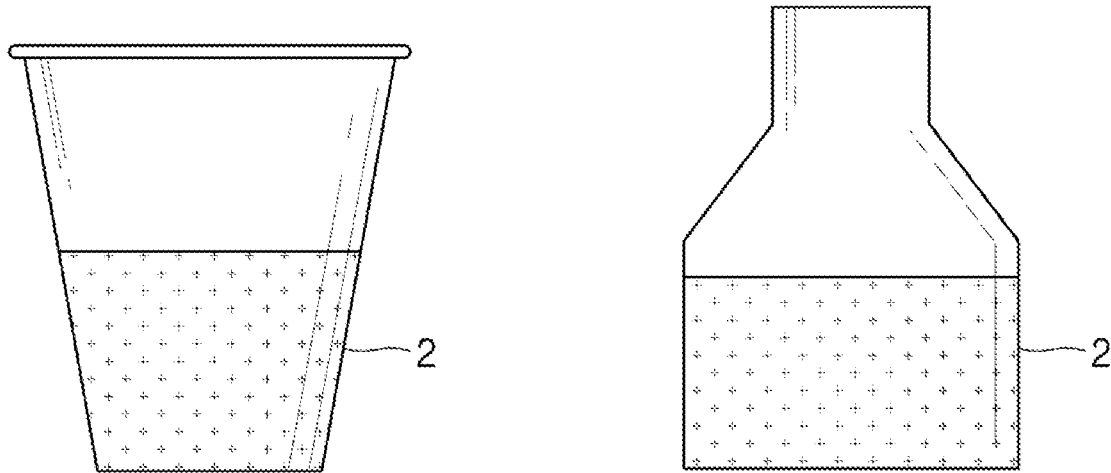
FIGS. 14 to 20 are views showing a concept of performing a part of steps of the method for controlling a water purifier in one embodiment.
Figure 15:
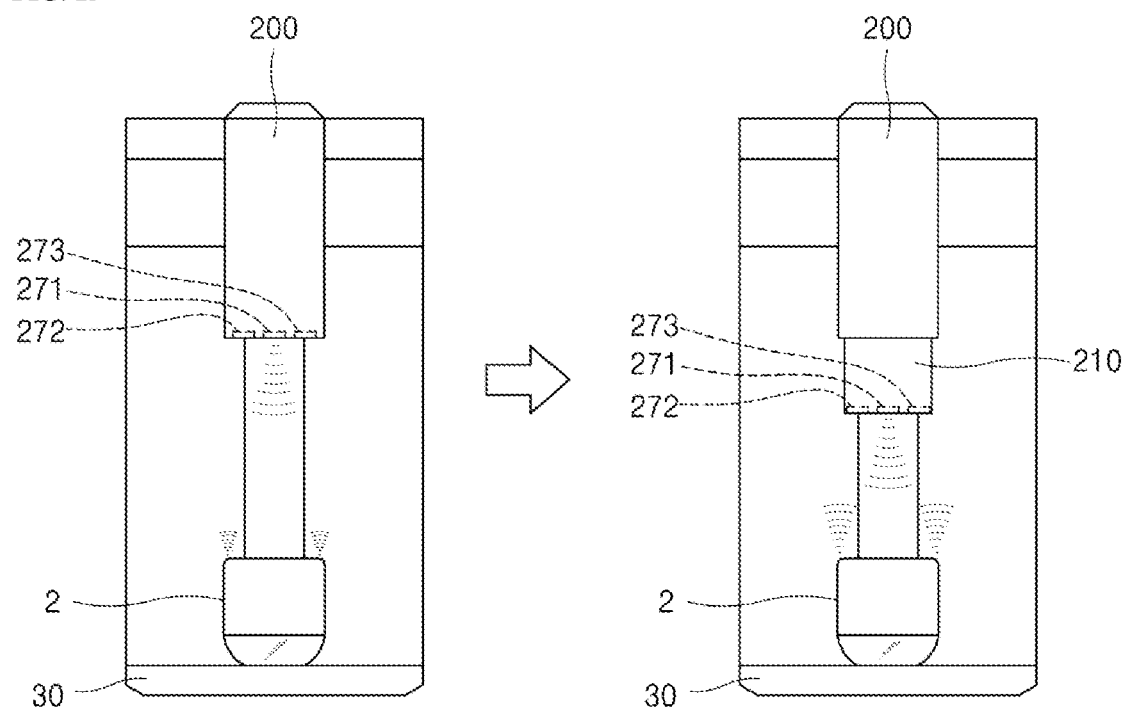

Hereunder, control over operation of the lifting motor 250 and the water discharge valve 241, based on distance data sensed by the ultrasonic sensor 270, is described. FIG. 13 is a flow chart showing a method for controlling a water purifier 1 in one embodiment. FIGS. 14 to 20 are views showing a concept of performing a part of steps of the method for controlling a water purifier 1. FIGS. 15, 17 and 20 show a schematic configuration of the water purifier 1 without the water discharge nozzle 240 for convenience of description.

Suppose that a container 2 is placed in any position between the water discharge module 20 and the tray 30. As described above, the second lifting cover 210 may only move vertically, or the first lifting cover 200 and the second lifting cover 210 may all move vertically. In the embodiment of FIG. 13, suppose that the second lifting cover 210 only moves vertically. Additionally, the vertical movement of the second lifting cover 210, and the vertical movement of the water discharge module 20 including the second lifting cover 210 are construed as being identical. Accordingly, the vertical movement of the water discharge module 20 is described hereunder.

Suppose that the water discharge module 20 is placed at a default point. The default point may correspond to an initial point of the water discharge module 20 in a state in which the water discharge module 20 does not move down. In an example, a default initial point is a position of the water discharge module 20 in FIG. 1, i.e., a position of the second lifting cover 210.

Further, suppose that the ultrasonic transmitter 271 disposed on the lower surface of the water discharge module 20 transmits an ultrasonic signal at a fixed beam angle, and that the two ultrasonic receivers 272, 273 receive a reflected ultrasonic signal and transmits the reflected ultrasonic signal to the controller 90.

Hereunder, each step of an operation process of the water purifier 1 is described with reference to FIG. 13. In step 10 (S10), the controller 90 sets signal amplification ratios of the ultrasonic receivers 272, 273 to a first signal amplification ratio. That is, in step 10 (S10), the controller 90 may set gains of the ultrasonic receivers 272, 273 to a first gain.

The controller 90 may set or adjust a signal amplification ratio by adjusting a feedback resistance value of an amplification circuit constituting the ultrasonic receivers 272, 273. In this case, the first signal amplification ratio may be set to a high signal amplification ratio. In one embodiment, the first signal amplification ratio may be maximum signal amplification ratios of the ultrasonic receivers 272, 273. Description in relation to this is provided below.

Then in step 12 (S12), the ultrasonic transmitter 271 transmits an ultrasonic signal. That is, in step 10 (S10), the ultrasonic transmitter 271 transmits an ultrasonic signal at a default point. The ultrasonic transmitter 271's operation of transmitting an ultrasonic signal may be controlled by the controller 90. As described above, the ultrasonic transmitter 271 may transmit an ultrasonic signal at a fixed beam angle.

In step (S14), the ultrasonic receivers 272, 273 receive a reflected ultrasonic signal. That is, in step 10 (S10), the ultrasonic receivers 272, 273 receive an ultrasonic signal at the default point.

Since the ultrasonic transmitter 271 emits an ultrasonic signal, the ultrasonic signal may be reflected from all points of the lower portion of the ultrasonic transmitter 271. In an example, when the container 2 has a shape in the left drawing of FIG. 14, the ultrasonic signal may be reflected from the inlet of the container 2 and the surface of the water contained in the container 2. In another example, when the container 2 has a shape in the right drawing of FIG. 14, the ultrasonic signal may be reflected from the inlet of the container 2, the middle part of the container 2 and the surface of the water contained in the container 2.

In this case, the reflected ultrasonic signal is received consecutively and chronologically. In other words, the ultrasonic receivers 272, 273 receive one or more reflected ultrasonic signals consecutively and chronologically. As a distance between the ultrasonic sensor 270 and an object becomes shorter, reflected ultrasonic signals are received quickly, and as a distance between the ultrasonic sensor 270 and an object becomes longer, reflected ultrasonic signals are received late.

Then in step 16 (S16), the controller 90 may determine whether intensity of the reflected ultrasonic signal exceeds a first threshold intensity. The first threshold intensity may be an intensity that is set to distinguish the reflected ultrasonic signal from a noise signal. Accordingly, the first threshold intensity may be a very low intensity.

When the intensity of the reflected ultrasonic signal is the first threshold intensity or less, the controller 90 may ascertain that the ultrasonic receivers 272, 273 fail to receive the reflected ultrasonic signal. When the intensity of the reflected ultrasonic signal is greater than the first threshold intensity, the controller 90 may ascertain that the ultrasonic receivers 272, 273 succeed in receiving the reflected ultrasonic signal.

Specifically, as a distance between the ultrasonic sensor 270 and an object is long, the transmitted ultrasonic signal cannot be reflected from the object or reflected in a very low intensity. In this case, the ultrasonic receivers 272, 273 fail to sense the reflected ultrasonic signal and receive the reflected ultrasonic signal. This relates to the left drawing of FIG. 15. That is, step 16 (S16) may correspond to the step of determining whether the ultrasonic receivers 272, 273 receive the reflected ultrasonic signal.

If the intensity of the reflected ultrasonic signal is the first threshold intensity or less, the controller 90 control the water discharge module 20 such that the water discharge module 20 moves down by a unit distance in step 18 (S18). Then steps 12 (S12) to step 16 (S16) are performed again.

Specifically, when the reflected ultrasonic signal is not received, the water discharge module 20 moves down by the unit distance in stages, and based on a position of the water discharge module 20 having moved down, the ultrasonic sensor 270 also moves down. Accordingly, a distance between the ultrasonic sensor 270 and the container 2 becomes short, and intensity of the ultrasonic signal reflected from the object increases. This relates to the right drawing of FIG. 15. Thus, the ultrasonic receivers 272, 273 succeeds in sensing the reflected ultrasonic signal.

The unit distance may be set in advance, and preferably, have a low distance value. Since the unit distance having a low distance value is set, steps 12 (S12) to 18 (S18) may be shown to the user as being performed in real time. On the contrary, when the intensity of the reflected ultrasonic signal exceeds the first threshold intensity, step 20 (S20) to step 36 (S36) are performed.

In this case, a point of the water discharge module 20, at which the intensity of the reflected ultrasonic signal exceeds the first threshold intensity, may correspond to the above-described first point of the water discharge module 20. That is, when the reflected ultrasonic signal having an intensity greater than the first threshold intensity is received at the default initial point. The first point of the water discharge module 20 may be the default initial point of the water discharge module 20. Additionally, when step 18 (S18) is performed at least one or more times, and step 12 (S12) to step 16 (S16) are performed one or more times again, the first point of the water discharge module 20 may be a final disposition point of the water discharge module 20 that is moved down in step 18 (S18).

In step 20 (S20), the controller 90 detects a height of the inlet of the container 2. That is, the controller 90 may detect a height of the inlet of the container 2, based on first distance data that are sensed when the water discharge module 20 is placed at the first point.

As described above, the first distance data may correspond to a time point of receipt of one or more reflected ultrasonic signals received consecutively. The time point of receipt of one or more reflected ultrasonic signals may be defined with respect to a time point at which the ultrasonic transmitter 271 transmits an ultrasonic signal.

In one embodiment, the controller 90 may detect a height of the inlet of the container 2, based on a time point of receipt of a reflected ultrasonic signal that is first received, among reflected ultrasonic signals that are consecutively received at the first point of the water discharge module 20. In this case, based on relationship formula "distance=speed× time" and an already informed speed of an ultrasonic signal, the controller 90 may detect a height of the inlet of the container 2 by applying the time point of receipt of a reflected ultrasonic signal that is first received to the above relationship formula.

Specifically, in step 10 (S10), the signal amplification ratios of the ultrasonic receivers 272, 273 are set to the first signal amplification ratio having a high value (e.g., a maximum signal amplification ratio). As the signal amplification ratio has a higher value, one or more reflected ultrasonic signals received consecutively are all amplified to have a high intensity. Additionally, as a distance between the ultrasonic sensor 270 and an object becomes shorter, reflected ultrasonic signals are received quickly, as described above. Ordinarily, the inlet of a container 2 is placed higher than the surface of water.

Figure 18:
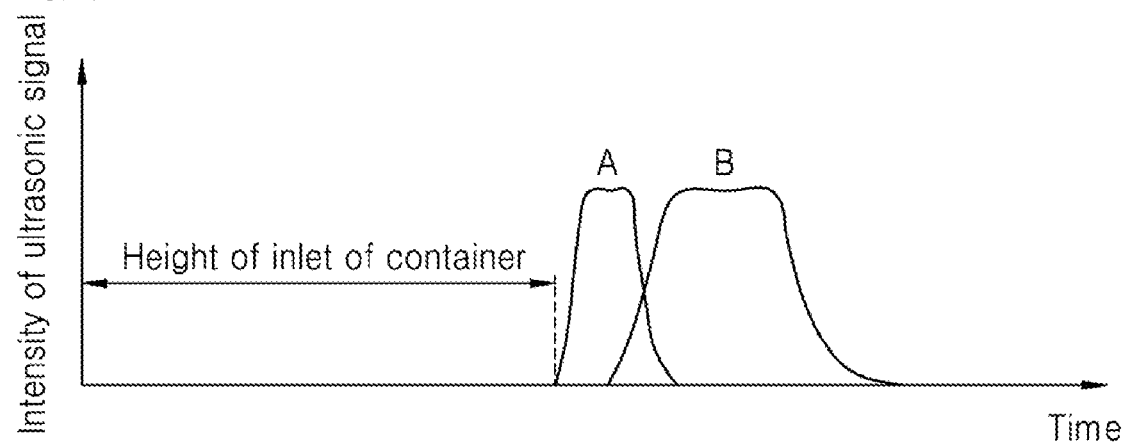

FIG. 18 shows a graph of intensity of a reflected ultrasonic signal that is received when the ultrasonic sensor 270 transmits an ultrasonic signal at the first point of the water discharge module 20. In this case, suppose that water (or purified water) is contained in the container 2. In FIG. 18, A corresponds to intensity of an ultrasonic signal reflected from the rim of the inlet of the container 2, and B corresponds to intensity of an ultrasonic signal reflected from the surface of the water contained in the container 2.

Referring to FIG. 18, the ultrasonic receivers 272, 273 receive the ultrasonic signal reflected from the inlet of the container 2 and then the ultrasonic signal reflected from the surface of the water contained in the container 2. Accordingly, the controller 90 may detect a height of the inlet of the container 2, based on a reflected ultrasonic signal that is first received, among time points of receipt of one or more reflected ultrasonic signals that are received at the first point of the water discharge module 20. The reflected ultrasonic signal that is first received may be an ultrasonic signal at which an ultrasonic signal transmitted is reflected from the rim of the inlet of the container 2.

Referring back to FIG. 13, in step 22 (S22), the controller 90 controls the water discharge module 20 such that the water discharge module 20 moves down to a point spaced upward from the detected height of the inlet of the container 2 by a first distance. That is, the controller 90 controls the water discharge module 20 such that the water discharge module 20 placed at the first point moves to a second point of the water discharge module 20, which is spaced upward from the height of the inlet of the container 2 by the first distance, based on the height of the inlet of the container 2. The second point of the water discharge module 20 may be a point at which the water discharge module 20 is placed to discharge the purified water to the container 2 and detect the height of the water (i.e., the purified water) contained in the container 2.

Specifically, a water purifier of the related art senses a height of the inlet of a container by using a contact sensor such as a pressure sensor installed on a lower surface of a water discharge module that moves vertically. Thus, in the water purifier of the related art, the lower surface of the water discharge module contacts the inlet of the container, causing a hygiene problem.

Unlike the water purifier of the related art, the water purifier 1 in one embodiment senses a height of the inlet of a container 2 and measures a height of the water contained in the container 2 describe below by using the ultrasonic sensor 270 that is a non-contact sensor. In this case, the water discharge module 20 of the water purifier 1 does not contact the inlet of the container 2. Thus, the water purifier 1 according to the disclosure can help to solve hygiene problems.

The first distance is set in advance to detect a height of the water contained in the container 2. In one embodiment, the first distance may be set to be inversely proportional to a beam angle of the ultrasonic transmitter 271. That is, as the beam angle of the ultrasonic transmitter 271 becomes wider, the first distance has a lower value, and as the beam angle of the ultrasonic transmitter 271 becomes narrower, the first distance has a higher value. Description in relation to this is provided below.

Then in step 24 (S24), the controller 90 sets the signal amplification ratios of the ultrasonic receivers 272, 273 to a second signal amplification ratio. That is, in step 24 (S24), the controller 90 sets the gains of the ultrasonic receivers 272, 273 to a second gain.

In this case, the second signal amplification ratio may be set to be different from the first signal amplification ratio described above. In particular, the second signal amplification ratio may be set to a low signal amplification ratio. That is, the second signal amplification ratio may be lower than the first signal amplification ratio. In one embodiment, the second signal amplification ratio may be a minimum signal amplification ratio of the ultrasonic receivers 272, 273.

The second signal amplification ratio is set to a low signal amplification ratio to measure a height of the water contained in the container 2 more accurately. Step 22 (S22) may be omitted. That is, the signal amplification ratios of the ultrasonic receivers 272, 273 may be maintained at the second signal amplification ratio that is described in step 10 (S10). Description in relation to this is provided below.

Then in step 26 (S26), the ultrasonic transmitter 271 transmits an ultrasonic signal. That is, in step 26 (S26), the ultrasonic transmitter 271 transmits an ultrasonic signal at a second point. The ultrasonic transmitter 271's operation of transmitting an ultrasonic signal may be controlled by the controller 90. Additionally, the ultrasonic transmitter 271 may transmit an ultrasonic signal at a fixed beam angle, as described above.

Then in step 28 (S28), the ultrasonic receivers 272, 273 receive a reflected ultrasonic signal. That is, in step 28 (S28), the ultrasonic receivers 272, 273 receive the ultrasonic signal at the second point.

Then in step 30 (S30), the controller 90 detects a height of the water (i.e., the purified water) contained in the container 2, i.e., a water level. That is, the controller 90 may detect a height of the water contained in the container 2, based on second distance data that are sensed when the water discharge module 20 is placed at the second point.

Figure 16:
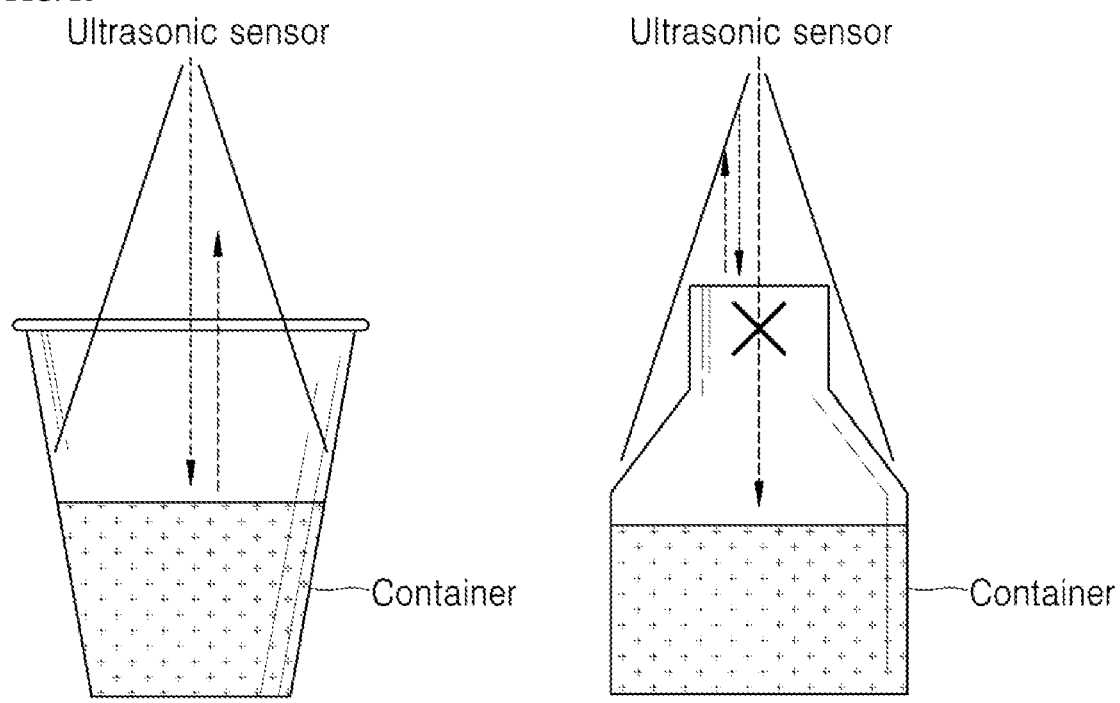
Figure 17:
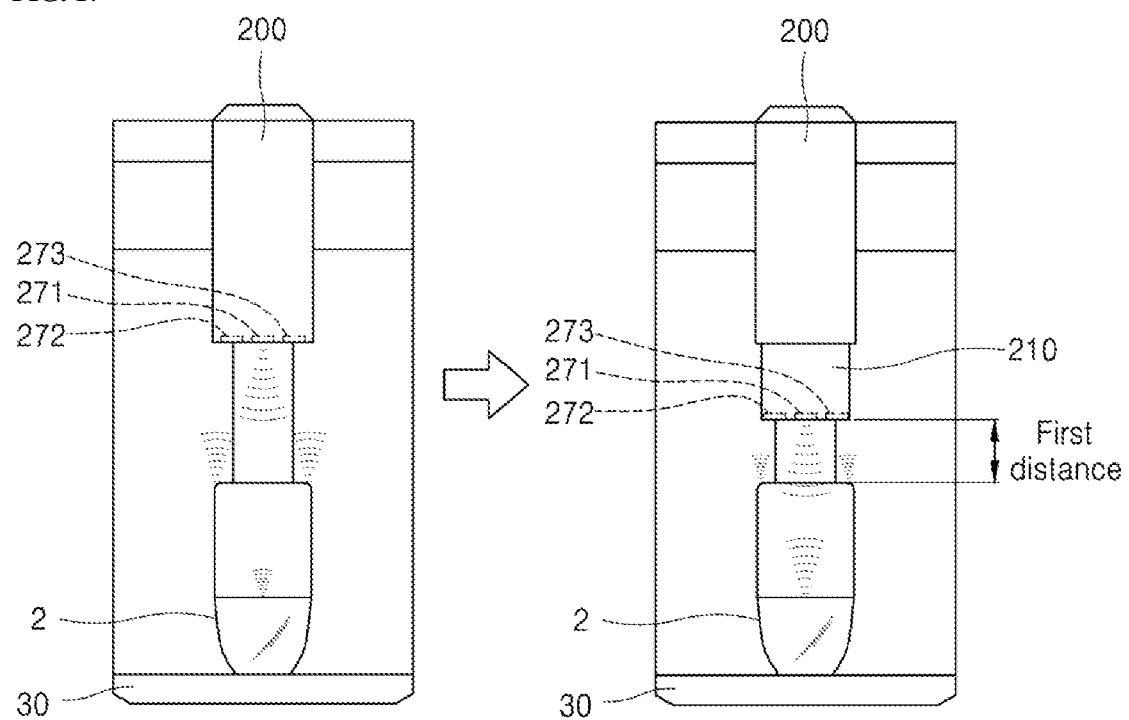

Specifically, in the related art in which an ultrasonic signal is transmitted at a fixed beam angle, and the water discharge module does not move vertically, when an ultrasonic signal is transmitted to a container having a wide inlet, a height of the water contained in the container is detected (see the left drawing of FIG. 16), but when an ultrasonic signal is transmitted to a container having a narrow inlet, a height of the water contained in the container is not detected (see the right drawing of FIG. 16). Accordingly, most of the ultrasonic signal is reflected from the rim of the narrow inlet of the container, and does not reach the surface of the water contained in the container.

However, in the water purifier 1 of one embodiment, the water discharge module 20 may move vertically. Accordingly, as illustrated in the left drawing of FIG. 17, the ultrasonic sensor 270 may transmit and receive an ultrasonic signal at the first point of the water discharge module 20, and detect a height of the inlet of a container 2. Further, as illustrated in the right drawing of FIG. 17, the water discharge module 20 moves down from the first point to the second point, and the ultrasonic sensor 270 may transmit and receive an ultrasonic signal at the second point of the water discharge module 20, and detect a height of the water contained in the container.

Thus, in the case of an ultrasonic sensor 270 that transmits an ultrasonic signal at a fixed beam angle, a smaller amount of an ultrasonic signal may be reflected from the rim of the inlet of the container. In conclusion, a height of the water contained in the container may be detected accurately. In this case, the first distance that defines the second point of the water discharge module 20 may relate to a beam angle of the ultrasonic transmitter 271.

When the beam angle of the ultrasonic transmitter 271 is wide, an ultrasonic signal is highly likely to be reflected from the rim of the inlet of the container 2. Accordingly, the second point of the water discharge module 20 may be set near the inlet of the container 20. That is, when the beam angle of the ultrasonic transmitter 271 is wide, the first distance may have a low distance value.

When the beam angle of the ultrasonic transmitter 271 is narrow, an ultrasonic signal is less likely to be reflected from the rim of the inlet of the container 2. Accordingly, the second point of the water discharge module 20 may be set slightly far from the inlet of the container 20. That is, when the beam angle of the ultrasonic transmitter 271 is narrow, the first distance may have a slightly high distance value.

The second point of the water discharge module 20 may also be set to prevent water from splashing from the container 2 when the water discharge module 20 discharges the water. That is, the second point or the first distance of the water discharge module 20 may be set for the purposes of measuring a water level accurately and preventing water from splashing in the container 2.

Additionally, in one embodiment, the controller 90 may detect a height of the water contained in the container 2, based on a time point of receipt of a reflected ultrasonic signal received at a second threshold intensity or greater, among reflected ultrasonic signals that are received consecutively at the second point of the water discharge module 20. In this case, relationship formula "distance=speed×time" is satisfied/used as described above. The controller 90 may apply the time point of receipt of a reflected ultrasonic signal received at a second threshold intensity or greater to the above relationship formula, to detect a height of the inlet of the container 2.

Specifically, in step 24 (S24), the signal amplification ratios of the ultrasonic receivers 272, 273 are set to the second signal amplification ratio (e.g., a minimum signal amplification ratio) that has a low value. As the signal amplification ratio has a lower value, one or more reflected ultrasonic signals received consecutively are all amplified at a low intensity.

In this case, since the water discharge module 20 is placed at the second point, transmitted ultrasonic signals are largely reflected from the surface of the water in the container 2, while the transmitted ultrasonic signals are reflected a bit from the rim of the inlet of the container 2. Thus, when the signal amplification ratios of the ultrasonic receivers 272, 273 have a low value (the second signal amplification ratio), intensity of the ultrasonic signals reflected from the rim of the inlet of the container 2 is low, while intensity of the ultrasonic signals reflected from the surface of the water is high.

Figure 19:
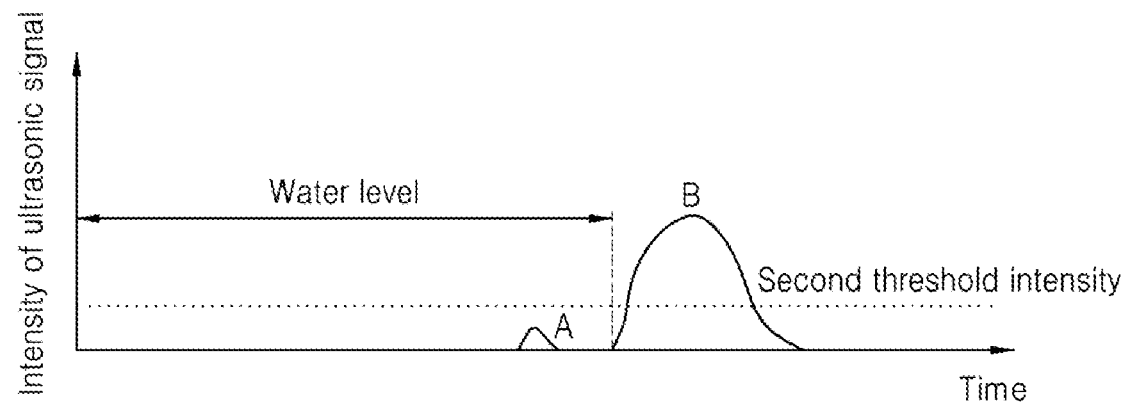
Figure 20:
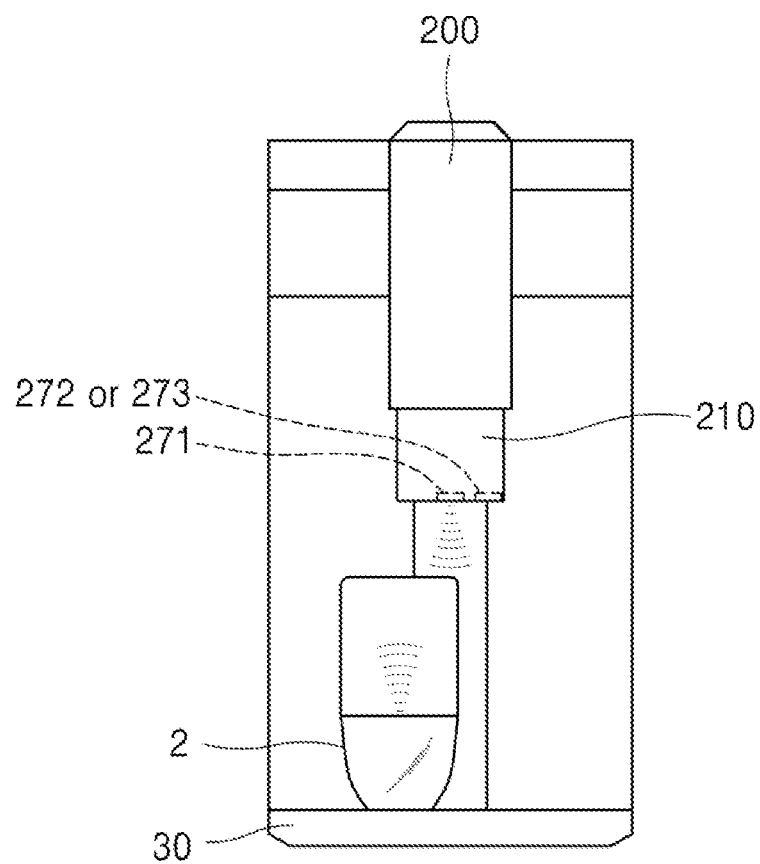

FIG. 19 shows a graph of intensity of a reflected ultrasonic signal that is received when the ultrasonic sensor 270 transmits an ultrasonic signal at the second point of the water discharge module 20. In this case, suppose that water (or purified water) is contained in the container 2. In FIG. 19, A corresponds to intensity of an ultrasonic signal reflected from the rim of the inlet of the container 2, and B corresponds to intensity of an ultrasonic signal reflected from the surface of the water contained in the container 2.

Referring to FIG. 19, the intensity of an ultrasonic signal reflected from the rim of the inlet of the container 2 is low, while the intensity of an ultrasonic signal reflected from the surface of the water is high. Specifically, the intensity of an ultrasonic signal reflected from the rim of the inlet of the container 2 is lower than the second threshold intensity, and the intensity of an ultrasonic signal reflected from the surface of the water contained in the container 2 is higher than the second threshold intensity.

Accordingly, the controller 90 may detect a height of the water contained in the container 2, based on a time point of receipt of a reflected ultrasonic signal received at the second threshold intensity or greater, among reflected ultrasonic signals that are received consecutively at the second point. In other words, the controller 90 may detect a height of the water contained in the container 2, based on a time point of receipt of a reflected ultrasonic signal of a maximum intensity, among reflected ultrasonic signals received consecutively at the second point.

The second threshold intensity may be set to be proportional to the signal amplification ratios of the ultrasonic receivers 272, 273. That is, as the signal amplification ratios of the ultrasonic receivers 272, 273 become higher, the second threshold intensity may be set to a higher intensity, and as the signal amplification ratios of the ultrasonic receivers 272, 273 become lower, the second threshold intensity may be set to a lower intensity.

In summary, in the water purifier 1 of one embodiment, while the water discharge module 20 is disposed at different points, a height of the inlet of the container 2 may be detected based on the first distance data that are sensed at the first point, and a height of the water contained in the container 2 may be detected based on the second distance data that are sensed at the second point below the first point. Accordingly, a height of the inlet of the container 2 and a height of the water contained in the container 2 may be detected accurately through a single ultrasonic sensor 270 having a fixed beam angle.

Further, the water purifier 1 in one embodiment may set the signal amplification ratios of the ultrasonic receivers 272, 273 differently at each of the first point and the second point of the water discharge module 20. Specifically, the signal amplification ratios at the second point of the water discharge module 20 may be set to be lower than the signal amplification ratios at the first point of the water discharge module 20. Thus, interference of one or more reflected ultrasonic signals received consecutively may be prevented such that a height of the inlet of the container 2 and a height of the water contained in the container 2 are accurately detected.

The water purifier 1 in one embodiment uses the two ultrasonic receivers 272, 273 having an identical signal amplification ratio. Accordingly, a height of the inlet of the container 2 and a height of the water may be detected accurately even if the user places the container in any position of the tray 30.

That is, referring to FIG. 20, when one ultrasonic receiver 272 or 273 is disposed at the right side of the ultrasonic transmitter 271, and the container 2 is disposed at the left side of the tray 30, one ultrasonic receiver 272 or 273 may not receive an ultrasonic signal reflected from the surface of the water, as is the case with the detection of a height of the inlet of the container 2.

However, according to the present disclosure, since the first and second ultrasonic receivers 272, 273 having an identical signal amplification ratio are disposed on both lateral surfaces of the ultrasonic transmitter 271, a height of the inlet of the container 2 and a height of the water contained in the container 2 may be detected accurately even if the container 2 is placed in any position of the tray 30.

Referring back to FIG. 13, in step 32 (S32), the controller 90 may determine whether the detected height of the water exceeds a target height. The target height may be a height input by the user through the input part 40. Alternatively, the target height may be a height at which purified water that is discharged does not over flow the container 2. In this case, the target height may be set based on a height of the inlet of the container 2 and a height of the water contained in the container 2.

If the detected height of the water is the target height or less, in step 34 (S34), the controller 90 controls the water discharge valve 241 to discharge purified water. Then step 26 (S26) to step 32 (S32) are performed again. If the detected height of the water is greater than the target height, the controller 90 controls the water discharge valve 241 to stop the discharge of purified water in step 36 (S36).

Though not illustrated in the drawings, the water discharge module 20 does not move vertically, and the tray 30 may move vertically, in another embodiment. That is, the water discharge module 20 having the ultrasonic sensor 270 on the lower surface thereof may be fixed to the main body 10, and the tray 30 may move in the up-down direction. The vertical movement of the tray 30 may be controlled by the controller 90. In this case, an operation similar to that described above may be performed in the water purifier 1.

In other words, the controller 90 may detect a height of the inlet of a container 2, based on first distance data that are sensed when the tray 30 is placed at a first point, and control the tray 30 such that the tray 30 moves up to a second point of the tray 30, at which the water discharge module 20 and the inlet of the container 2 are spaced by a first distance. Then a height of the water may be detected based on second distance data that are sensed when the tray 3 is placed at the second point. The first point may be a default initial position of the tray 30 or a final disposition point of the tray 30 that s moved up for measurement of a height of the inlet of the container 2.

The configuration of the water purifier 1 in one embodiment is summed up as follows. In the water purifier 1 of one embodiment, the water discharge module capable of moving vertically is provided with a sensor, in particular, the ultrasonic sensor 270. Specifically, in the water purifier 1, the ultrasonic sensor 270 transmits and receives an ultrasonic signal for measuring a distance at the first point of the water discharge module 20 to measure a height of a container 2, and transmits and receives an ultrasonic signal at the second point of the water discharge module 20 to measure a height of the water contained in the container 2. Accordingly, a height of the container 2 (i.e., a height of the inlet of the container 2) and a water level (i.e., a height of water) may all be detected using a single ultrasonic sensor 270.

In one embodiment, when the ultrasonic sensor 270 is disposed on the lower surface of the water discharge module, the second point of the water discharge module 20 is set to a point spaced from the height of the inlet of the container 2 by a certain distance (i.e., the first distance) such that the inlet of the container 2 does not contact the lower surface of the water discharge module 20, thereby solving hygiene problems.

Additionally, in one embodiment, when a height of the container 2 is measured, the ultrasonic sensor 270 moves down to accurately measure a height of the inlet of the container 2. In particular, even if the inlet of the container or the rim of the inlet of the container is narrow, a height of the container may be accurately measured.

Further, in one embodiment, the first and second ultrasonic receivers 272, 273 having an identical signal amplification ratio are disposed on both lateral surfaces of the ultrasonic transmitter 271 such that a height of the inlet of the container and a water level are accurately measured and errors in the measurement of a height of the inlet of the container and a water level are prevented even if the user places the container in any position.

Furthermore, in one embodiment, a single ultrasonic sensor 270 having a fixed beam angle is attached to the water discharge module 20 instead of an ultrasonic sensor having a beam angle that varies to detect all of the height of the inlet of the container and a water level, thereby reducing manufacturing costs of the water purifier 1.

The embodiments according to the present disclosure can be implemented in the form of program instructions to be executed through a variety of computer devices and can be recorded on a computer-readable recording medium. The computer-readable recording medium may include program instructions, data files, data structures and the like independently or combinations thereof.

One aspect of the present disclosure is to provide a water purifying device and a method for controlling the same that measures a height of the inlet of a container and a water level accurately.

Another aspect of the present disclosure is to provide a water purifying device and a method for controlling the same that measures a height of the inlet of a container and a water level without causing hygiene problems.

Another aspect of the present disclosure is to provide a water purifying device and a method for controlling the same that measures a height of a container and a water level accurately even if a user places the container in any position.

Yet another aspect of the present disclosure is to provide a water purifying device and a method for controlling the same that measures a height of a container accurately even if the container has a narrow inlet rim.

Aspects according to the present disclosure are not limited to the above ones, and other aspects and advantages that are not mentioned above can be clearly understood from the following description and can be more clearly understood from the embodiments set forth herein.

In a water purifying device of one embodiment, a water discharge module that can move vertically is provided with a sensor. Specifically, in the water purifying device, the sensor measures a height of a container, by transmitting and receiving a signal for measuring a distance at a first point of the water discharge module, and detects both of a height of the inlet of the container and a water level, by transmitting and receiving the signal at a second point of the water discharge module and measuring a water level.

In a water purifying device of one embodiment, when the sensor is disposed on a lower surface of the water discharge module, the second point of the water discharge module is set to a point that is spaced from the height of the inlet of the container by a certain distance (i.e., a first distance), such that the inlet of the container does not contact the lower surface of the water discharge module.

The water purifying device of one embodiment moves the sensor down when measuring the height of the inlet of the container, to measure the height of the inlet of the container accurately.

In the water purifying device of one embodiment, an ultrasonic sensor is used as the sensor, and first and second ultrasonic receivers having an identical signal amplification ratio are disposed on both lateral surfaces of an ultrasonic transmitter, to measure the height of the inlet of the container and the water level accurately even if a user places the container in any position.

In the water purifying device of one embodiment, a single ultrasonic sensor having a fixed beam angle is attached to the water discharge module instead of an ultrasonic sensor having a beam angle that varies, to measure both the height of the inlet of the container and the water level. In this case, the first distance is set to be inversely proportional to the beam angle of the ultrasonic transmitter.

In the water purifying device of one embodiment, the ultrasonic sensor's amplification ratio of a received signal at the first point, and the ultrasonic sensor's amplification ratio of a received signal at the second point are set differently, so that the inlet height of the inlet of the container and the level of the water are measured without interfered with each other. In this case, a first signal amplification ratio is set to be greater than a second signal amplification ratio, and the first signal amplification ratio is set to a maximum signal amplification ratio of the ultrasonic receiver while the second signal amplification ratio is set to a minimum signal amplification ratio of the ultrasonic receiver.

A water purifying device in one embodiment may include a main body including a filter for filtering raw water to generate purified water, a water discharge module configured to discharge the purified water to a container disposed in a lower portion of the main body while vertically moving at a front of the main body, and a controller configured to control the vertical movement of the water discharge module, and to detect a height of the inlet of the container and a level of the purified water contained in the container based on received distance data in relation to the container, and the controller may be configured to detect the height of the inlet of the container, based on first distance data that are sensed when the water discharge module is placed at a first point, to control the water discharge module such that the water discharge module moves down to a second point that is spaced upward from the detected height of the inlet of the container by a first distance, and to detect the level of the purified water, based on second distance data that are sensed when the water discharge module is placed at the second point. In this case, the first distance may be set to be inversely proportional to a beam angle of the ultrasonic transmitter.

A water purifying device in another embodiment may include a main body including a filter for filtering raw water to generate purified water, a water discharge module configured to discharge the purified water to a container disposed in a lower portion of the main body, a tray disposed below the water discharge module and configured to move vertically, and a controller configured to control the vertical movement of the tray, and to detect a height of the inlet of the container and a level of the purified water contained in the container based on received distance data in relation to the container. The controller may be configured to detect the height of the inlet of the container, based on first distance data that are sensed when the tray is placed at a first point, to control the tray such that the tray moves down to a second point that is spaced upward from the detected height of the inlet of the container by a first distance, and to detect the level of the purified water based on second distance data that are sensed when the tray is placed at the second point.

A method for controlling a water purifying device in yet another embodiment, including a main body including a filter for filtering raw water to generate purified water, a water discharge module configured to move vertically at a front of the main body and discharge the purified water, and a controller configured to control a sensor installed in the water discharge module and the water discharge module and perform calculation for detecting a height, may include sensing first distance data at a first point of the water discharge module by the sensor, detecting a height of the inlet of a container disposed in a lower portion of the water discharge module by the controller, based on the first distance data, controlling the water discharge module such that the water discharge module moves down to a second point of the water discharge module, which is spaced upward from the height of the inlet of the container by a first distance, by the controller, sensing second distance data at the second point by the sensor, and detecting a water level contained in the container by the controller, based on the second distance data.

According to the present disclosure, a single water discharge module that moves vertically may be provided with a sensor, thereby detecting both a height of a container and a water level accurately. According to the present disclosure, the inlet of the container may be prevented from contacting a lower surface of the water discharge module, thereby solving hygiene problems.

According to the present disclosure, the sensor may move down when the height of the container is measured, thereby measuring the height of the container accurately even if the container has a narrow inlet or a narrow inlet rim. According to the present disclosure, first and second ultrasonic receivers having an identical signal amplification ratio may be disposed on both lateral surfaces of an ultrasonic transmitter, thereby preventing errors in the measurement of the height of the inlet of the container and the water level. According to the present disclosure, a single ultrasonic sensor having a fixed beam angle may be attached to the water discharge module, thereby reducing production costs.

The components and features and the like are described above with reference to the limited embodiments and accompanying drawings set forth herein for a better understanding of the subject matter in the present disclosure. However, the subject matter of the disclosure is not limited to the embodiments set forth herein. Modifications and changes can be drawn from the disclosure in various different ways by one having ordinary skill in the art. Therefore, it is to be understood that the technical spirit of the disclosure is not construed as being limited by the embodiments herein and that equivalents and equivalent modifications drawn from the scope of the appended claims are included in the scope of the technical spirit of the disclosure.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments are described herein with reference to cross-section illustrations that are schematic illustrations of idealized embodiments (and intermediate structures). As such, variations from the shapes of the illustrations as a result, for example, of manufacturing techniques and/or tolerances, are to be expected. Thus, embodiments should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid dispensing device, comprising:
a main body;
a liquid discharge module configured to discharge a liquid to a container and to move vertically at a front of the main body;
a controller configured to control a vertical movement of the liquid discharge module, and to determine a height of an inlet of the container and a level of the liquid contained in the container based on received distance data; and
a sensor installed in the liquid discharge module and configured to sense the distance data a d transmit the distance data to the controller,
wherein the controller is configured to determine the height of the inlet of the container based on first distance data, of the distance data, that is sensed when the liquid discharge module is at a first position and to control the liquid discharge module such that the liquid discharge module moves to a second position that is spaced upward from the height of the inlet of the container by a first distance, and
wherein the controller is configured to determine the level of the liquid based on second distance data, of the distance data, that is sensed when the liquid discharge module is at the second position, and
wherein the sensor moves together with the liquid discharge module to sense the first distance data about the height of the inlet of the container at the first position and to sense the second distance data about the level of the liquid at the second position.

2. The liquid dispensing device of claim 1, wherein the sensor is provided on a lower surface of the liquid discharge module.

3. The liquid purifying device of claim 1, wherein the sensor is an ultrasonic sensor, and
the ultrasonic sensor includes
an ultrasonic wave transmitter configured to transmit ultrasonic waves, and
an ultrasonic receiver configured to receive reflected ultrasonic waves.

4. The liquid dispensing device of claim 3, wherein the ultrasonic transmitter transmits ultrasonic waves at a fixed beam angle.

5. The liquid dispensing device of claim 4, wherein the first distance is set to be inversely proportional to a beam angle of the ultrasonic transmitter.

6. The liquid dispensing device of claim 3, wherein a first signal amplification ratio of the ultrasonic receiver when the liquid discharge module is at the first position differs from a second signal amplification ratio of the ultrasonic receiver when the liquid discharge module is at the second position.

7. The liquid dispensing device of claim 6, wherein the first signal amplification ratio is set to be greater than the second signal amplification ratio.

8. The liquid dispensing device of claim 7, wherein the first signal amplification ratio is a maximum signal amplification ratio of the ultrasonic receiver, and the second signal amplification ratio is a minimum signal amplification ratio of the ultrasonic receiver.

9. The liquid dispensing device of claim 3, wherein the first distance data correspond to time points of receipt of reflected ultrasonic waves when the liquid discharge module is at the first position, and
the controller determines the height of the inlet of the container based on one of the time points associated with receipt of ones of the reflected ultrasonic waves that are first received when the liquid discharge module is at the first position.

10. The liquid dispensing device of claim 9, wherein the ones of the reflected ultrasonic waves that are first received are ones of the transmitted ultrasonic waves are reflected from a rim of the inlet of the container.

11. The liquid dispensing device of claim 3, wherein the second distance data correspond to time points of receipt of reflected ultrasonic waves when the liquid discharge module is at the first position, and
the controller detects the level of the liquid contained in the container, based on ones of the time points of receipt of ones of the reflected ultrasonic waves that are received at a predetermined threshold intensity or greater, among the reflected ultrasonic waves.

12. The liquid dispensing device of claim 11, wherein the ones of the reflected ultrasonic waves received at the threshold intensity or greater are ultrasonic waves reflected from a surface of the liquid contained in the container.

13. The liquid dispensing device of claim 11, wherein the threshold intensity is set to be proportional to a signal amplification ratio of the ultrasonic receiver.

14. The liquid dispensing device of claim 3, wherein
the ultrasonic receiver includes a first ultrasonic receiver positioned at a first side of the ultrasonic transmitter, and a second ultrasonic receiver positioned at a second side of the ultrasonic transmitter, and
a signal amplification ratio of the first ultrasonic receiver corresponds to a signal amplification ratio of the second ultrasonic receiver.

15. The liquid dispensing device of claim 1, wherein the first position is a default initial position of the liquid discharge module.

16. The liquid dispensing device of claim 1, wherein
the sensor transmits a distance measuring signal at a default initial position of the liquid discharge module, and
when a reflection of the distance measuring signal is not received when the liquid discharge module is at the initial position, the controller controls the liquid discharge module such that the liquid discharge module moves down from the initial position.

17. The liquid dispensing device of claim 1, wherein the controller adjusts discharge of the liquid based on the height of the inlet of the container and the level of the liquid contained in the container, such that the liquid does not overflow the container.

18. A method for controlling a liquid dispensing device comprising a main body, a liquid discharge module configured to move vertically at a front of the main body and to discharge the liquid, a controller, and a sensor installed in the liquid discharge module, the method comprising:
sensing first distance data at a first position of the liquid discharge module, by the sensor;
determining a height of the inlet of a container positioned below the liquid discharge module, by the controller and based on the first distance data;
controlling the liquid discharge module such that the liquid discharge module moves from the first position and down to a second positioned, at which the liquid discharge module is spaced upward from the height of the inlet of the container by a first distance, by the controller;
sensing second distance data when the liquid discharge module is at the second position, by the sensor;
determining a height of liquid contained in the container, by the controller and based on the second distance data; and
dispensing the liquid based on the height of the inlet of the container and the height of the liquid in the container, by the liquid discharge module, and
wherein the sensor moves together with the liquid discharge module to sense the first distance data al oi t the height of the inlet of the container at the first position and to sense the second distance data about the height of the liquid in the container at the second position.

* * * * *